United States Patent [19]

Hara et al.

[11] Patent Number: 5,355,689
[45] Date of Patent: Oct. 18, 1994

[54] HEAT PUMP TYPE AIR CONDITIONER FOR AUTOMOTIVE VEHICLE

[75] Inventors: Junichiro Hara, Yokohama; Takayoshi Matsuoka, Yokosuka, both of Japan

[73] Assignee: Nissan Motor Co., Ltd., Yokohama, Japan

[21] Appl. No.: 66,265

[22] Filed: May 25, 1993

[30] Foreign Application Priority Data

May 25, 1992 [JP] Japan ................... 4-132380
Mar. 3, 1993 [JP] Japan ................... 5-042468

[51] Int. Cl.⁵ .................. F25B 29/00; F25B 41/00
[52] U.S. Cl. ................... 62/159; 62/180; 62/196.4
[58] Field of Search ............. 62/196.4, 117, 159, 62/173, 90, 176.5; 165/43; 236/75

[56] References Cited

U.S. PATENT DOCUMENTS

| | | | |
|---|---|---|---|
| 3,738,117 | 6/1973 | Engel | 62/173 |
| 3,798,920 | 3/1974 | Morgan | 62/173 |
| 3,914,952 | 10/1975 | Barbier | 236/75 X |

FOREIGN PATENT DOCUMENTS 2-130808 10/1990 Japan.
2-290475 11/1990 Japan.

*Primary Examiner*—William E. Wayner
*Attorney, Agent, or Firm*—Lowe, Price, LeBlanc & Becker

[57] ABSTRACT

A heat pump type air conditioner for an automotive vehicle has a compressor whose outlet is connected to a condenser and a heat-radiating inner heat exchanger through a three-way valve. The heat-radiating inner heat exchanger is connected to an evaporator through an expansion valve. The evaporator is connected to an inlet of the compressor. During a cooling operation, the three-way valve is set to lead the refrigerant from the compressor to the condenser. During a heating operation, the three-way valve is set to lead the refrigerant from the compressor to the heat-radiating inner heat exchanger while bypassing the condenser. A control unit controls such that a cooling efficiency of the condenser is lowered for a predetermined time when the compressor is started. Therefore, the heating operation is securely implemented, and a start-up period in starting is shortened. Furthermore, the freezing of the condenser is avoided.

17 Claims, 26 Drawing Sheets

HEAT PUMP TYPE AIR CONDITIONER FOR AUTOMOTIVE VEHICLE

BACKGROUND OF THE INVENTION

1. Field of the Invention

The present invention relates to improvements in a heat pump type air conditioner applied to an automotive vehicle, and more particularly to an air conditioner which is provided with a vapor-compression refrigeration cycle.

2. Description of the Prior Art

It is well known that a heat pump type air conditioner is applied to an automotive vehicle and provided with a four-way valve by which refrigerant flow is changed between a heating operation and a cooling operation. During the heating operation, an outer heat exchanger is used as a heat absorber, and an inner heat exchanger is used as a heat radiator. On the other hand, during the cooling operation, the outer heat exchanger is used as a heat radiator, and the inner heat exchanger is used as a heat absorber. Such a heat pump type air conditioner is disclosed, for example, in Japanese Patent Provisional Publication No. 2-290475 and Japanese Utility Model Provisional Publication No. 2-130808.

As shown in FIG. 31, during a heating operation, a four-way valve 2 is set as indicated by a continuous line in FIG. 31, and refrigerant is circulated as follows: A compressor 1 → the four-way valve 2 → a first inner heat exchanger 3 → a heating heat exchanger 4 → a second inner heat exchanger 5 → an expansion valve 6 → an outer heat exchanger 7 → the four-way valve 2 → a receiver 8 → the compressor 1. Accordingly, the heat of the refrigerant is transmitted to air led by a blower fan 9 and used for heating a passenger compartment. The heat from an engine 10 is transmitted to the refrigerant through the heating heat exchanger 4 and further transmitted from the refrigerant to air led by a blower fan 11 for heating the passenger compartment. The heat of the air led by a fan 12 is transmitted to the refrigerant through the outer heat exchanger 7.

On the other hand, during the cooling operation, the four-way valve 2 is set as indicated by a broken line in FIG. 30 and refrigerant is circulated as follows: The compressor 1 → the outer heat exchanger 7 → the expansion valve 6 → the second inner heat exchanger 5 → the first inner heat exchanger 3 → the four-way valve 2 → the receiver 8 → the compressor 1. Accordingly, the heat of the refrigerant discharged from the compressor 1 is radiated into the atmosphere by the outer heat exchanger 7, the heat of air led by blower fans 9 and 11 is radiated to the refrigerant by the first and second inner heat exchanger 3 and 5, and the cooled air is supplied into the passenger compartment.

With such a conventional heat pump type air conditioner, the absorbed heat amount by the outer heat exchanger 7 is decreased during the heating operation under conditions such that the ambient temperature is low, the automotive vehicle is in running, or it is raining or snowing. Furthermore, if the workload of the compressor 1 is constant, the radiated heat amount from the first and second inner heat exchangers 3 and 5 which radiate the sum of the heat absorbing amount from the outer heat exchanger 7 is decreased, and the heating capacity of the air conditioner is lowered. Additionally, the lowering of the heating capacity invites the frost to the heat exchanger. This increases a defrost operation and prevents a stable heating operation. Furthermore, since the conventional air conditioner is arranged such that the flow direction of the refrigerant is changed under the cooling and heating operations, it is necessary to change the design of the conduits of the outer and inner heat exchangers 7, 3, and 5 so as to endure high temperature and high pressure.

Also, since the conventional heat pump type air conditioner is arranged to generate heated air for heating by utilizing the waste heat of the engine 10 during the heating operation, it can not be sufficiently operated if applied to a vehicle which only has small heat source, such as to a solar car or electric vehicle.

Furthermore, with the conventional heat pump type air conditioner, when it is started under a low ambient air temperature condition, an evaporation temperature of the refrigerant at the outer heat exchanger 7 is lowered due to a low air temperature to the outer heat exchanger 7. This lowers temperature and pressure of the refrigerant fed to the compressor 1.

Refrigeration capacity R and input W of the compressor 1 are represented by the following equations:

$$R = \eta v \times \rho v \times V \times q0 \quad \text{(Watt)}$$

$$W = \eta v \times \rho v \times V \times AL(\eta c \times \eta m) \quad \text{(Watt)}$$

wherein $\eta v$ is volumetric efficiency, $\eta c$ is adiabatic compression efficiency, $\eta m$ is mechanical efficiency, $\rho v$ is refrigerant density (kg/m$^3$), V is compressor discharge (m$^3$/s), q0 is refrigerating effect (J/kg), and AL is adiabatic compression work.

Accordingly, if the temperature and/or pressure of the refrigerant fed to the compressor 1 is lowered, the volumetric efficiency $\eta v$ and the adiabatic compression efficiency $\eta c$ are degraded according to the increase of the compression ratio of the compressor 1, and the refrigerant density $\rho v$ is decreased. Since the change of the refrigerant density $\rho v$ becomes larger than that of the volumetric efficiency $\eta v$, the adiabatic compression efficiency $\eta c$, or the adiabatic compression work (J/kg); the refrigeration efficiency R and the input W of the compressor 1 is largely lowered by the main effect of the change of the refrigerant density $\rho v$, as is clear from the above-equations. Accordingly, the heat radiation amount at the inner heat exchangers 3 and 5 becomes small, and therefore, it is difficult to operate the conventional air conditioner under low ambient temperature condition. Although it is possible to increase the input W of the compressor 1 by increasing rotation speed for the increase of the compressor discharge V, such increase of the rotation speed occurs problems such that the compressor 1 largely generates noise and vibration and degrades its durability.

SUMMARY OF THE INVENTION

It is an object of the present invention to provide an improved heat pump type air conditioner which improves an air-conditioning capacity.

Anther object of the present invention is to provide a heat pump type air conditioner which realizes both a rapid heating property and a window-fining property under a low ambient temperature.

A first aspect of the present invention resides in a heat pump type air conditioner for an automotive vehicle. The heat pump type air conditioner comprise a compressor which applies a workload to refrigerant. A condenser is connected to a refrigerant discharge side of the compressor and radiating heat of the refrigerant into ambient air. A blower leads air for air-conditioning the passenger compartment of the automotive vehicle. A heat-radiating inner heat exchanger is connected to the refrigerant discharge side of the compressor and transmits the heat of the refrigerant to the air led by the blower. An expansion valve is connected to a refrigerant outlet side of the heat-radiating inner heat exchanger. An evaporator is connected to a refrigerant outlet side of the expansion valve. The evaporator transmits the heat of the air led by the blower to the refrigerant which is supplied through the expansion valve from at least one of said condenser and the heat-radiating inner heat exchanger. A switching device is disposed among the refrigerant discharge side of the compressor. The switching device is set at one of a first state in that the compressor is fluidly communicated with the condenser and a second state in that the compressor is fluidly communicated with the heat-radiating inner heat exchanger. A cooling efficiency of the evaporator is lowered for a predetermined time when the compressor is started.

A second aspect of the present invention resides in a heat pump type air conditioner for an automotive vehicle. The heat pump type air conditioner comprises a compressor which applies a workload to refrigerant. A condenser is connected to a refrigerant discharge side of the compressor and radiating heat of the refrigerant into ambient air. A blower leads air for air-conditioning the passenger compartment of the automotive vehicle. A heat-radiating inner heat exchanger is connected to the refrigerant discharge side of the compressor and transmits the heat of the refrigerant to the air led by the blower. An expansion valve is connected to a refrigerant outlet side of the heat-radiating inner heat exchanger. An evaporator is connected to a refrigerant outlet side of the expansion valve. The evaporator transmits the heat of the air led by the blower to the refrigerant which is supplied through the expansion valve from at least one of said condenser and the heat-radiating inner heat exchanger. A switching device is disposed among the refrigerant discharge side of the compressor. The switching device is set at one of a first state in that the compressor is fluidly communicated with the condenser and a second state in that the compressor is fluidly communicated with the heat-radiating inner heat exchanger. An air flow rate changing means changes flow rate of the air fed into the heat-radiating inner heat exchanger. A thermal information detecting means detects at least one of thermal information of the refrigerant and thermal information of the automotive vehicle inside and outside. A process selecting means divides the heating operation into plural processes which have different heating properties, respectively. The process selecting means selects one of the process on the basis of the thermal information detected by the thermal information detecting means. An air flow rate control means variably controls the air flow rate changing means on the basis of the selected process and the detected thermal information.

A third aspect of the present invention resides in a heat pump type air conditioner for an automotive vehicle. The heat pump type air conditioner comprises a compressor which applies a workload to refrigerant. A condenser is connected to a refrigerant discharge side of the compressor and radiating heat of the refrigerant into ambient air. A blower leads air for air-conditioning the passenger compartment of the automotive vehicle. A heat-radiating inner heat exchanger is connected to the refrigerant discharge side of the compressor and transmits the heat of the refrigerant to the air led by the blower. An expansion valve a variable opening degree type is connected to a refrigerant outlet side of the heat-radiating inner heat exchanger. An evaporator is connected to a refrigerant outlet side of the expansion valve. The evaporator transmits the heat of the air led by the blower to the refrigerant which is supplied through the expansion valve from at least one of said condenser and the heat-radiating inner heat exchanger. A switching device is disposed among the refrigerant discharge side of the compressor. The switching device is set at one of a first state in that the compressor is fluidly communicated with the condenser and a second state in that the compressor is fluidly communicated with the heat-radiating inner heat exchanger. A thermal information detecting means detects at least one of thermal information of the refrigerant and thermal information of the automotive vehicle inside and outside. An expansion valve controlling means controls an opening degree of the expansion valve on the basis of the detected thermal information such that the flow rate of the refrigerant is maintained to be larger than a predetermined value.

BRIEF DESCRIPTION OF THE DRAWINGS

In the drawings, like reference numerals designate like parts and like elements throughout all figures, in which.

DETAILED DESCRIPTION OF THE INVENTION

Referring to FIGS. 1 to 17, there is shown a first embodiment of a heat pump type air conditioner for an automotive vehicle according to the present invention.

Figure 1:
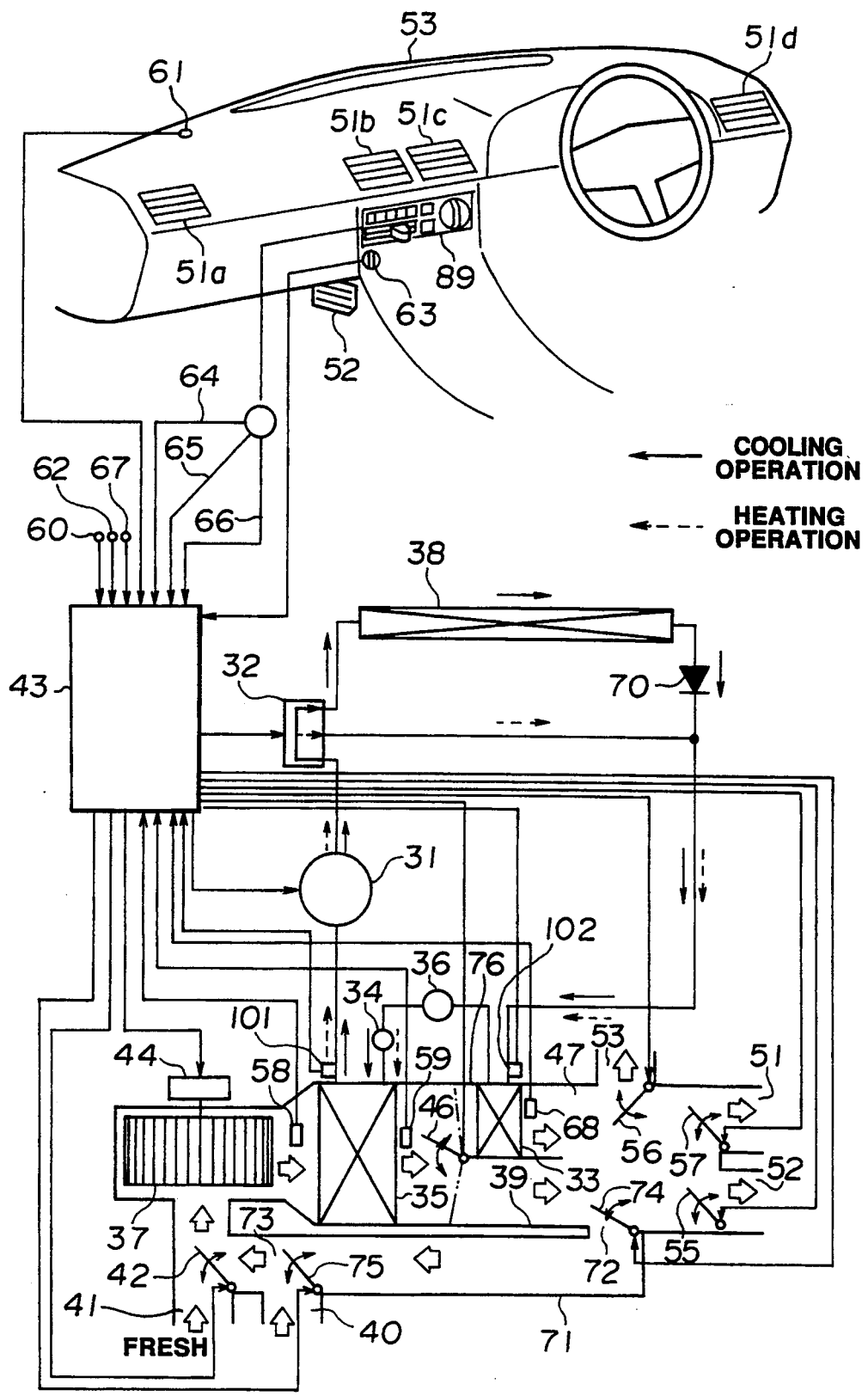
FIG. 1 is a schematic view showing a whole structure of a heat pump type air conditioner according to the present invention.
Figure 2:
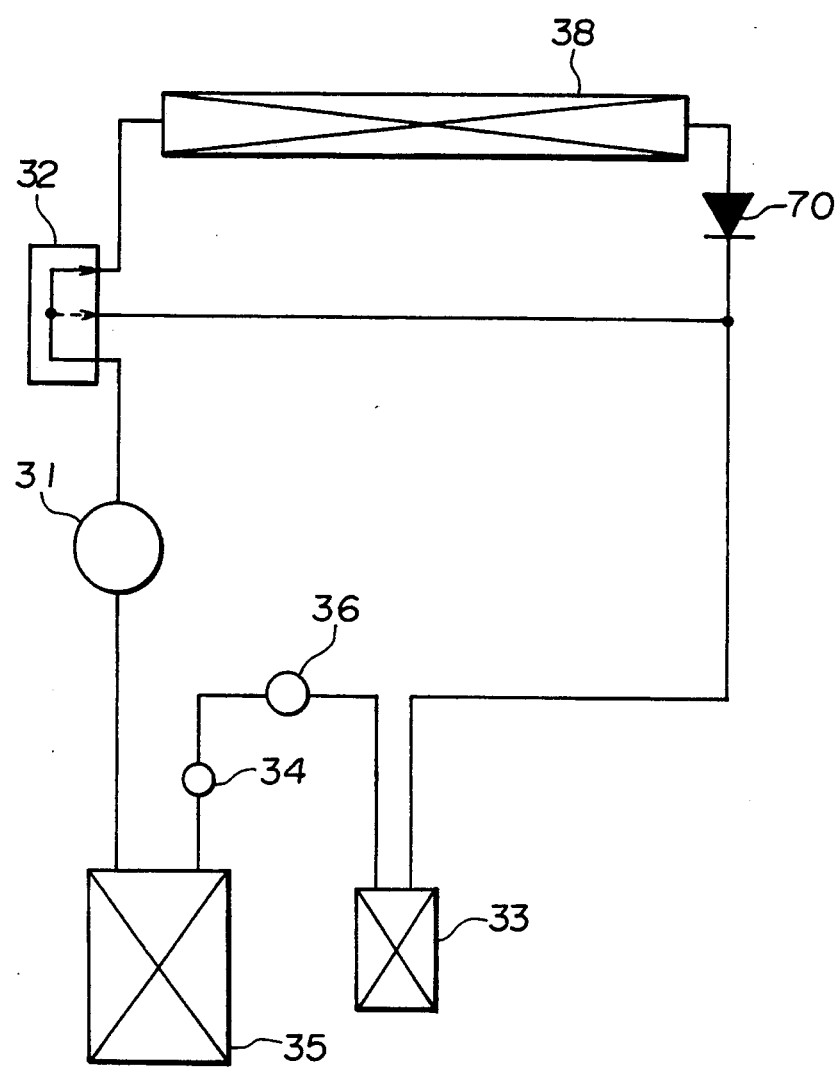
FIG. 2 is a block diagram showing a refrigerant cycle of the heat pump type air conditioner of FIG. 1.

As shown in FIGS. 1 and 2, a compressor 31 is disposed outside of a passenger compartment of the automotive vehicle, such as in an engine room. The compressor 31 is of a type which variably changes an input power, such as of an electric drive type or hydraulic drive type. An outer heat exchanger or condenser 38 and a heat-radiating inner heat exchanger 33 are connected to a discharge side of the compressor 31 through a three-way valve 32. The outer heat exchanger 38 is disposed outside of the passenger compartment and serves as an outer condenser for radiating heat of the refrigerant discharged from the compressor 31 into the atmosphere. The heat-radiating inner heat exchanger 33 is disposed in a duct 39 which serves as a main body of the air conditioner. The duct 39 is located at a front portion of the passenger compartment, such as at a back side of an instrument panel. A blower fan 37 functioning as a blowing means is disposed near an inlet of the duct 39. The heat-radiating inner heat exchanger 33 serves as an inner condenser of a radiating type in which heat of the refrigerant discharged from the compressor 31 is radiated into the air led by the blower fan 37. During a heating operation, the three-way valve 32 is set at a state shown by a dotted arrow in FIG. 1 and communicates the discharge side of the compressor 31 and a refrigerant inlet of the heat-radiating inner heat exchanger 33. On the other hand, during a cooling operation, the three-way valve 32 is set at a state shown by an arrow in FIG. 1 and communicates the discharge side of the compressor 31 and the refrigerant inlet of the outer heat exchanger 38. The refrigerant outlet of the outer heat exchanger 38 is connected to the refrigerant inlet of the heat-radiating inner heat exchanger 33 through a one-way valve 70. The one-way valve 70 is arranged to allow refrigerant to flow from the outer heat exchanger 38 to the heat-radiating inner heat exchanger 33 and to prevent the refrigerant from flowing from the heat-radiating inner heat exchanger 33 to the outer heat exchanger 38.

The refrigerant outlet of the heat-radiating inner heat exchanger 33 is connected to a refrigerant inlet of a heat-absorbing inner heat exchanger or evaporator 35 through a receiver 36 and an expansion valve 34. The expansion valve 34 is disposed outside of the passenger compartment and serves as an expansion means for atomizing liquid refrigerant by the adiabatic expansion. The receiver 36 is also disposed outside of the passenger compartment. The heat-absorbing inner heat exchanger 35 is disposed upstream of the heat-radiating inner heat exchanger 33 in the duct 39. The heat-absorbing inner heat exchanger 35 serves as an evaporator of an endothermic type by which the heat of the air led by the blower fan 37 is absorbed into the refrigerant supplied from at least one of the outer heat exchanger 38 and the heat-radiating inner heat exchanger 33 through the expansion valve 34. A refrigerant outlet of the heat-absorbing inner heat exchanger 35 is connected to the inlet of the compressor 31.

An auxiliary heater 76 is disposed at an air inlet side of the heat-radiating inner heat exchanger 33. The auxiliary heater 76 is an electric heater and of a type which variably changes output according to input voltage controlled by the control unit 43. When the auxiliary heater 76 is turned on, the air passing through the heat-radiating inner heat exchanger 33 is heated, and the temperature of the refrigerant which flows through the heat-radiating inner heat exchanger 33 is increased.

In the duct 39, an inner air inlet 40 for leading the air into the passenger compartment and an outer air inlet 41 for leading outside air due to the wind pressure caused by the running of the automotive vehicle are disposed upstream of the heat-absorbing inner heat exchanger 35. An intake door 42 for properly mixing the air from the inner air inlet 40 and the air from the outer air inlet 41 is disposed at a dividing portion between the inner and outer air inlets 40 and 41 in the duct 39. The intake door 42 is arranged to open and close the outer inlet 41 by using an intake door actuator (not shown) controlled by the control unit 43. The blower fan 37 is disposed downstream of the inner and outer air inlets 40 and 41 and upstream of the heat-absorbing inner heat exchanger 35 in the duct 39 and arranged to be rotated by a blower fan motor 44 controlled by the control unit 43.

An air mixing door 46 is disposed upstream of the heat-radiating inner heat exchanger 33 in the duct 39. The air mixing door 46 is driven by an air mixing door actuator (not shown) controlled by the control unit 43 so as to change the ratio of air flow rates of cool air and hot air, wherein the cool air is air which bypasses the heat-radiating inner heat exchanger 33 and the hot air is the air which passes through the heat-radiating inner heat exchanger 33. An opening degree $X_{dsc}$ of the air mixing door 46 is defined as follows: When the air mixing door 46 is located at a position indicated by a long and short dash line in FIG. 1, that is, when the ratio of the cool air is 100%, the opening degree $X_{dsc}$ is defined as 0% (full close condition). When the air mixing door 46 is located at a position indicated by a long and two short dashes line in FIG. 1, that is, when the ratio of the hot air is 100%, the opening degree $X_{dsc}$ is defined as 100% (full open condition).

In order to further improve the mixing between cool air and hot air, an air mixing chamber 47 is disposed downstream of the heat-radiating inner heat exchanger 33 in the duct 39. The air mixing chamber 47 has a ventilator outlet 51 for feeding the conditioned air toward an upper side of a vehicle passenger (not shown), a foot outlet 52 for feeding the conditioned air toward a foot portion of the vehicle passenger, and a defroster outlet 53 for feeding the conditioned air toward a front glass (not shown) of the automotive vehicle. A ventilator door 55, a foot door 56, and a defroster door 57 are disposed in the air mixing chamber 47. The ventilator door 57 is arranged to open and close the ventilator outlet 51 according to the operation of a ventilator door actuator (not shown) which is controlled by the control unit 43. The foot door 55 is arranged to open and close the foot outlet 52 according to the operation of a foot door actuator (not shown) which is controlled by the control unit 43. The defroster door 56 is arranged to open and close the defroster outlet 53 according to the operation of a defroster door actuator (not shown) which is controlled by the control unit 43.

A circulation passage 71 is disposed to communicate the air mixing chamber 47 and the inner air inlet 40. An inlet door 74 is disposed at an opening 72 of the circulation passage 71 which opening is formed in the vicinity of the air mixing chamber 47 in the duct 39. An outlet door 75 is disposed at a branch portion 73 between the circulation passage 71 and the inner air inlet 40. The inlet door 74 is arranged to open and close the opening 72 by means of an inlet door actuator (not shown) which is driven according to a signal from the control unit 43. The outlet door 75 is arranged to change a communicating condition of the branch portion 73 by means of an outlet door actuator (not shown) which is driven according to a signal from the control unit 43. That is, the conditioned air is circulated from the air mixing chamber 47 to an upstream side of the blower fan 37 when the inlet door 74 and the outlet door 75 are opened wherein the outlet door 75 is positioned to close the inner air port 40.

The control unit 43 is connected to thermal information detecting means such as an inlet air temperature sensor 58 for the heat-absorbing inner heat exchanger 35, an outlet air temperature sensor 59 for the heat-absorbing inner heat exchanger 35, an outlet air temperature sensor 60 for the ventilator outlet 51, a solar radiation sensor 61, an outer air (ambient) temperature sensor 62, a room air temperature sensor 63, a room air temperature setting device 64 which is disposed in an air-conditioner panel 89, an outlet-port mode switch 65, a blower fan switch 66, a refrigerant temperature sensor 67, and an outlet air temperature sensor 68 of the heat-radiating inner heat exchanger 33.

The control unit 43 calculates target air-conditioned state, such as the opening degree $X_{dsc}$, an input value $W_{comp}$ of the compressor 31, an air flow rate $V_{eva}$ passing through the heat-absorbing inner heat exchanger 35, and a target outlet air temperature $T_{of}$ according to thermal information from the thermal information detecting means. Furthermore, on the basis of the calculated values, the control unit 43 controls the compressor 31, the blower fan motor 44, the air-mixing door actuator, the return door actuator, the ventilator door actuator, the foot door actuator, and the defroster door actuator so as to correspond the air-conditioned state with the calculated target air-conditioned state. The inlet air temperature sensor 58 detects an inlet air temperature $T_{suc}$ and sends it to the control unit 43. The outlet air temperature sensor 59 detects an outlet air temperature $T_{out}$ and sends it to the control unit 43. The blowout air temperature sensor 60 detects a ventilator outlet air temperature $T_{vent}$ and sends it to the control unit 43. The solar radiation sensor 61 detects a solar radiation amount $Q_{sun}$ to the vehicle and sends it to the control unit 43. The ambient air temperature sensor 62 detects an ambient air temperature $T_{amb}$ and sends it to the control unit 43. The room air temperature sensor 63 detects a room air temperature $T_{room}$ and sends it to the control unit 43. A preset room temperature $T_{ptc}$ set at the room temperature setting device 64 is sent to the control unit 43. The refrigerant temperature sensor 67 detects a refrigerant temperature $T_{ref}$ of the refrigerant outlet of the heat-radiating inner heat exchanger 33 and sends it to the control unit 43. The outlet air temperature sensor 68 detects the outlet air temperature $T_v$ and sends it to the control unit 43. Such detected data function as the thermal information.

On the other hand, a switching between the cooling and heating operations is implemented in such a manner that the control unit 43 controls the switching of the three-way valve 32 according to a preset temperature. The preset temperature is set at a predetermined value such that a target conditioned air temperature according to the thermal information generally corresponds to a boundary temperature where window-clouding does not cause due to the relation between the detected room temperature $T_{room}$ and the ambient temperature $T_{amb}$.

During the heating operation, the air-conditioning operation is implemented such that the outlet air temperature $T_{out}$ from the heat-absorbing inner heat exchanger 35 primarily becomes lower than the temperature $T_{fine}$ where clouding of windows of the automotive vehicle does not cause due to the relationship between the detected room temperature $T_{room}$ and the ambient temperature $T_{amb}$ and primarily becomes higher than an upper-limit temperature $T_{set0}$ of the freezing of the heat-absorbing inner heat exchanger 35 ($T_{set0} < T_{out} < T_{fine}$).

The control unit 43 judges according to the target outlet air temperature T o f during the heating operation whether or not a warm-up control is now implemented. When the warm-up control is implemented, a difference $\Delta \theta_1$ is obtained from the target outlet air temperature $T_{of}$ and the outlet air temperature $T_v$ of the heat-radiating inner heat exchanger 33, and a difference $\Delta \theta_2$ is obtained from the preset temperature $T_{set1}$ determined on the basis of freezing of the heat-absorbing inner heat exchanger 35 and the outlet air temperature $T_{out}$ of the heat-absorbing inner heat exchanger 35. Furthermore, on the basis of the differences $\Delta \theta_1$ and $\Delta \theta_2$, the control unit 43 controls the compressor 31, the expansion valve 34, the blower fan motor 44, the auxiliary heater 76, the air mixing door actuator, the ventilator door actuator, the foot door actuator, the defroster door actuator, the inlet door actuator, and the outlet door actuator, so as to increase the compressor input while avoiding the freezing of the heat-absorbing inner heat exchanger 35.

That is, the control unit 43, the air mixing door 46, and the air mixing door actuator function as a means for once lowering the inlet air flow rate of the heat-radiating inner heat exchanger 33. Also, the control unit 43 and the auxiliary heater 76 function as a means for once increasing the inlet air temperature of the heat-radiating inner heat exchanger 33. Further, the control unit 43 and the expansion valve 34 function as a means for once lowering the cooling efficiency of the heat-radiating inner heat exchanger 33.

Figure 4:
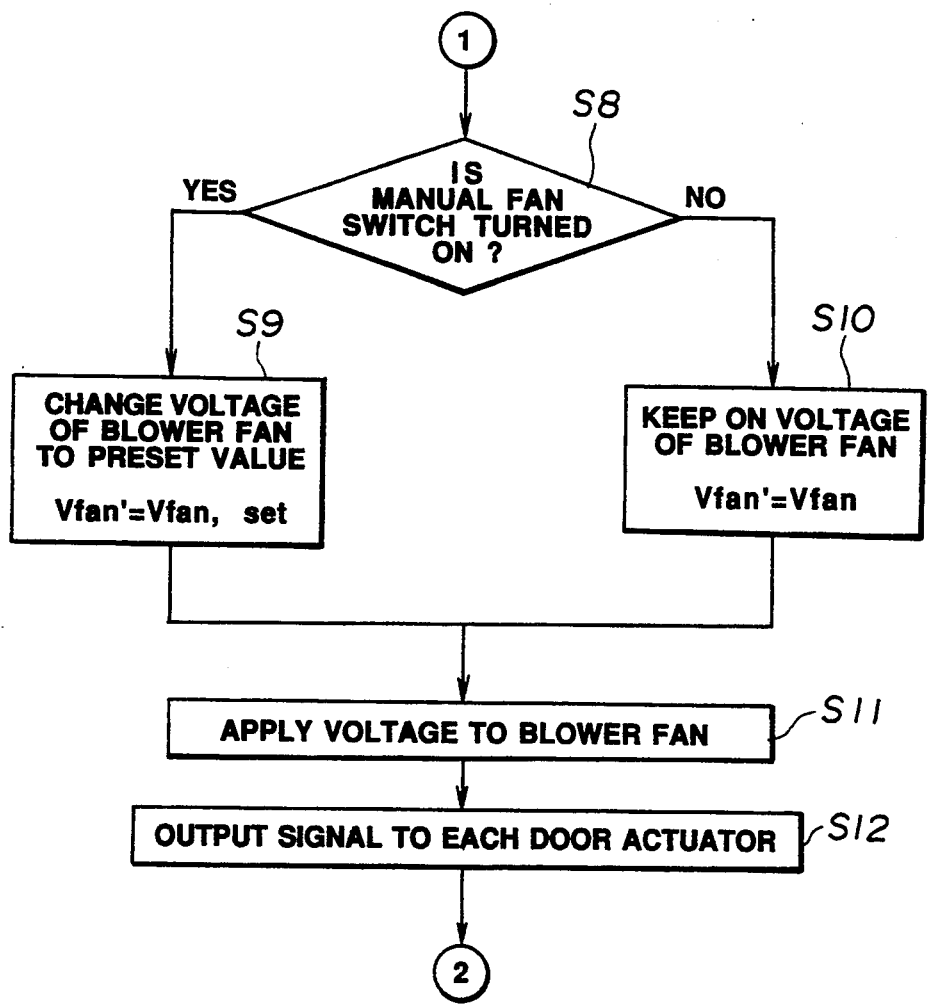
Figure 5:
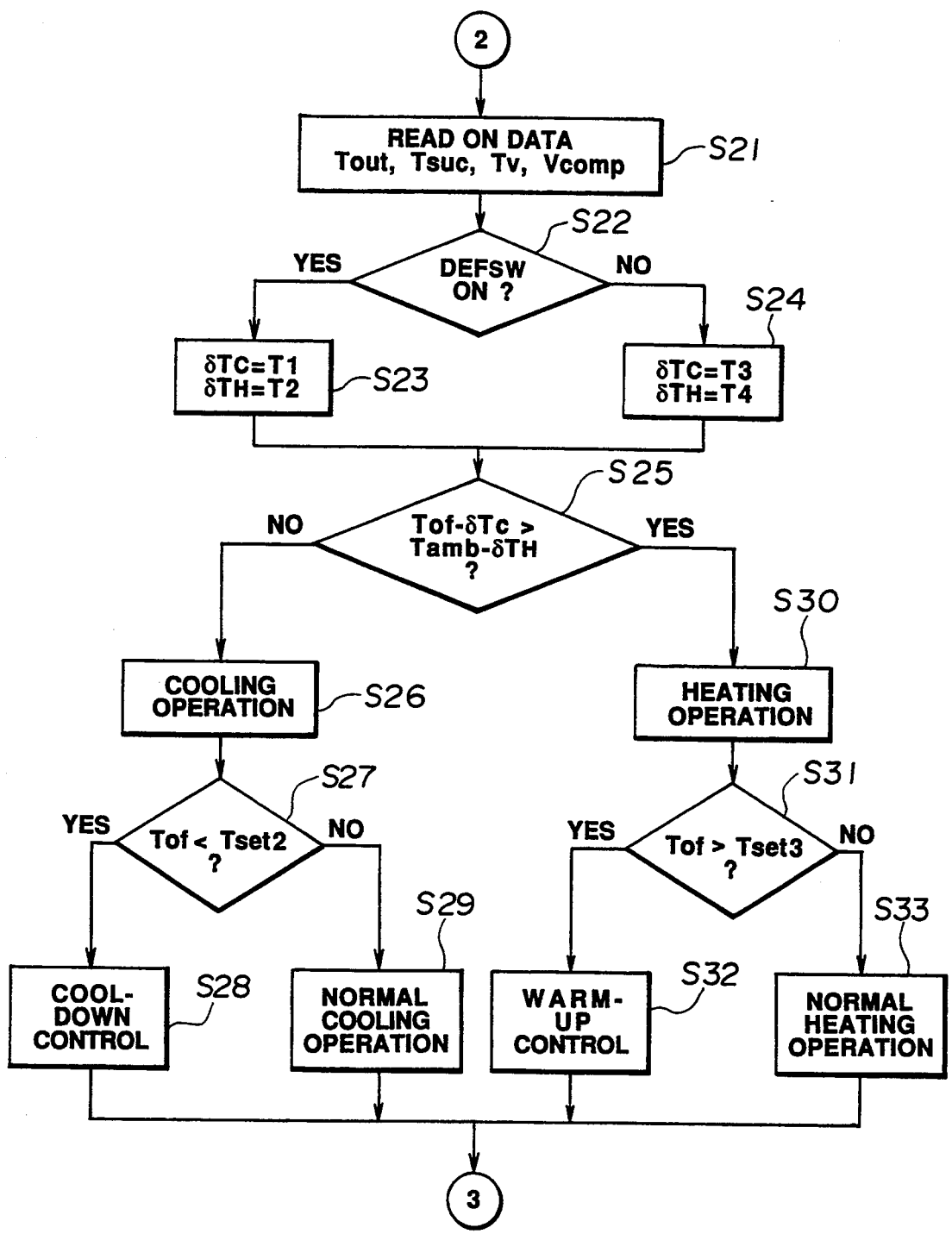

With reference to flow charts of FIGS. 3 to 5, the manner of controlling operation of the first embodiment of the heat pump type air conditioner for the automotive vehicle will be discussed hereinafter.

Figure 3:
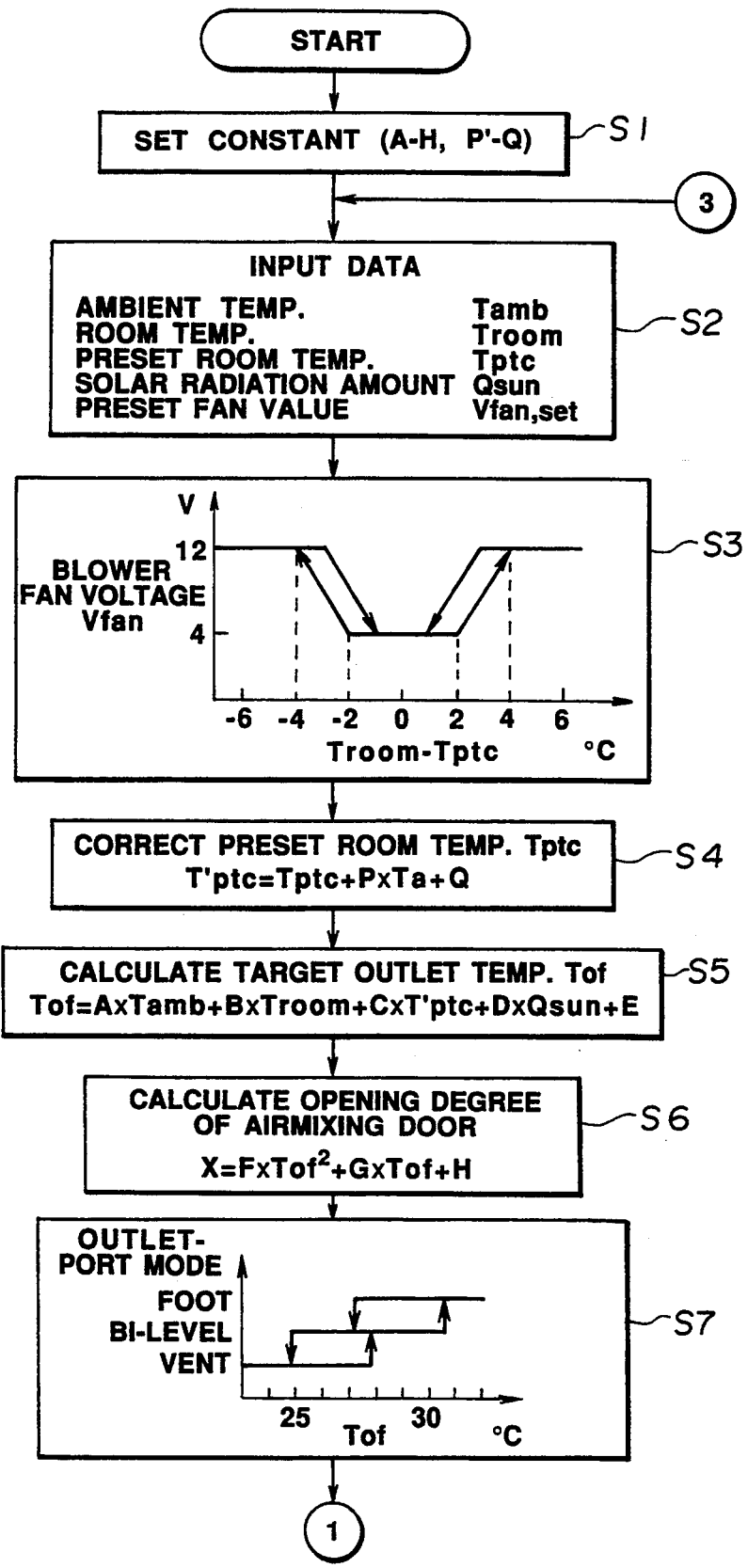
FIGS. 3 to 17 are flow charts which show controls in a first embodiment of the heat pump type air conditioner according to the present invention.

The program in FIG. 3 starts processing with the start of the control unit 43 which is turned-on by the turning-on of a main switch of the air conditioner. As shown in FIG. 3, in a step S1, constants A to H, P, and Q are set in the control unit 43. In the program, the constants A to E are applied to an equation by which the target outlet air temperature To f is calculated; the constants F, G, and H are applied to an equation by which the opening degree X of the air mixing door 46 is calculated; and the constants P and Q are used as a correction of the preset room temperature.

In a step S2, the control unit 43 reads on the outputs from the various sensors (the thermal information detecting means), such as an output signal indicative of the room air temperature $T_{room}$ from the room air temperature sensor 63, an output signal indicative of the solar radiation $Q_{sun}$ of the solar radiation sensor 61, an output signal indicative of the ambient air temperature $T_{amb}$ of the ambient air temperature sensor 62, an output signal indicative of the preset room air temperature $T_{ptc}$ of the room air temperature setting device 64, and an output signal indicative of a preset value $V_{fan,set}$ of the fan switch.

In a step S3, the applied voltage $V_{fan}$ of the blower fan 37 is determined according to a difference ($T_{room} - T_{ptc}$) between the preset room air temperature $T_{ptc}$ and the room air temperature $T_{room}$, in order to control the air flow rate caused by the blower fan 37. In concrete terms, as is clear from a graph shown in the step S3, the applied voltage $V_{fan}$ is increased in accordance with the increase of the difference ($T_{room}$-$T_{ptc}$) so as to rapidly approach the room air temperature $T_{room}$ to the preset room air temperature $T_{ptc}$.

In a step S4, the correction of the preset room air temperature $T_{ptc}$ is implemented by using the following equation:

$$T'_{ptc} = T_{ptc} + P \times T_{amb} + Q$$

In concrete terms, when the ambient air temperature $T_{amb}$ is low, the preset room air temperature is increase. When the ambient air temperature is high, the preset room air temperature is decreased. This correction is implemented by the following reason: Normally, men feel cool when the room air temperature is lowered under an environment where men feel hot, and feel warm when the room air temperature is increased under an environment where men feel cold. Thus, by correcting the preset room air temperature so as to be in reverse proportion to an environmental temperature, men receive thermal stimulation and obtain amenity.

In a step S5, the target outlet air temperature $T_{of}$ is calculated by using the following equation:

$$T_{of} = A \times T_{amb} + B \times T_{room} + C \times T'_{ptc} + D \times Q_{sun} + E$$

where A, B, C, D, and E are constant, $T_{amb}$ is the ambient air temperature, $T_{room}$ is the room air temperature, $T'_{ptc}$ is a corrected preset room air temperature, and $Q_{sun}$ is the solar radiation amount.

In a step S6, the opening degree X of the air mixing door 46 is calculated on the basis of the target outlet air temperature $T_{of}$ by the following equation:

$$X = F \times T_{of}^2 + G \times T_{of} + H$$

where F, G, and H are constants.

In a step S7, the outlet-port mode is determined on the basis of the target outlet air temperature $T_{of}$. That is, when the target outlet air temperature $T_{of}$ is high, the FOOT mode is selected so as to feed the conditioned air to passenger's feet. When medium, the hi-level mode is selected so as to feed the conditioned air to passenger's feet and breast. When low, the VENT mode is selected so as to feed the conditioned air to passenger's beast.

In a step S8, it is judged whether a manual fan switch (no numeral) is turned on by a passenger or not. When the manual fan switch is turned on, the program proceeds to a step S9 wherein the value $V_{fan,set}$ is determined as a final value (fan preset value $V_{fan'} = V_{fan, set}$). When the manual fan switch is not turned on, the program proceeds to a step S10 wherein the value determined in the step S3 is used as the blower fan voltage ($V_{fan'} = V_{fan}$).

In a step S11, the blower fan voltage $V_{fan}$, set, which is determined in the step S9 or step S10, is outputted to the blower fan motor 44.

In a step S12, the corresponding signals are outputted to the door actuators such that the corresponding doors are automatically disposed at predetermined positions, respectively. Following this, the program proceeds to a step S21 shown in FIG. 5.

In the step S21, the control unit 43 reads on other data which is not read on in the step S2. That is, the outlet air temperature $T_{out}$ of the heat-absorbing inner heat exchanger 35, the inlet air temperature $T_{suc}$ of the heat-absorbing inner heat exchanger 35, the outlet air temperature $T_v$ of the heat-radiating inner heat exchanger 33, and the physical amount $V_{comp}$ indicative of the workload of the compressor 31 are read on by the control unit 43. The discharge amount of the compressor 31 increases in proportion to the increase of the physical amount $V_{comp}$, and the workload of the compressor 31 increases similarly. If an electric compressor is applied as the compressor 31, frequency corresponds to the physical amount.

In a step S22, it is judged whether the defroster switch is turned on or not. When a defroster switch (no numeral) is turned on, the program proceeds to a step S23. When is not turned on, the program proceeds to a step S24.

In the step S23, correction terms are applied to the target cooling condition of the heat-absorbing inner heat exchanger 35 under a condition that the defroster switch is turned on. A correction term $\delta T_C$ is for the outlet air temperature of the heat-absorbing inner heat exchanger 35 to be a target value during the cooling operation. A correction term $\delta T_H$ is for an upper-limit cooling temperature (window-fining temperature) during the heating operation. When the defroster switch is turned on, the target cooling condition at the heat-radiating inner heat exchanger 35 is set at a further low condition in order to increase the humidification amount, and the reheating amount by the heat-radiating inner heat exchanger 33 is increased. With these operations, the conditioned air fed to the passenger compartment is conditioned at a target outlet air temperature. Similarly, in a step S24, the correction terms are applied to the target cooling condition of the heat-absorbing inner heat exchanger 35 under a condition that the defroster switch does not turned on.

In a step S25, the cooling condition of the heat-absorbing inner heat exchanger 35 during the cooling operation and that of the heat-absorbing inner heat exchanger 35 during the heating operation are compared by using the correction terms obtained in the step S23 or step S24. When the cooling condition of the heat-absorbing inner heat exchanger 35 during the cooling operation becomes lower than that during the heating operation, the program proceeds to a step S26 wherein the cooling operation is implemented. When the cooling condition of the heat-absorbing inner heat exchanger 35 during the heating operation becomes lower than that during the cooling operation, the program proceeds to a step S30 wherein the heating operation is implemented.

In the step S26, the three-way valve 32 is switched to the cooling operation state so as to feed the refrigerant from the compressor 31 to the outer heat exchanger 38.

In a step S27, the target outlet air temperature To f and a preset air temperature $T_{set2}$ are compared. When $T_{of} < T_{set2}$, it is judged that the cooling of the passenger compartment is insufficient, and the program proceeds to a step S28 wherein a cool-down control is implemented. When $T_{of} \geq T_{set2}$, it is judged that the room air temperature generally becomes the same as the target air temperature, and the program proceeds to a step S29 wherein a normal cooling operation is implemented.

In the step S30, the three-way valve 32 is switched to the heating operation state so as to directly feed the refrigerant from the compressor 31 to the heat-radiating inner heat exchanger 33.

Following this, in a step S31, the target outlet air temperature $T_{of}$ and a preset temperature $T_{set3}$ are compared. When $T_{of} > T_{set3}$, that is, when the passenger compartment is not sufficiently heated, the program proceeds to a step S32 wherein a warm-up control is implemented. When $T_{of} \leq T_{set3}$, that is, when the compartment temperature approaches the target temperature, the program proceeds to a step S33 wherein a normal heating operation is implemented. After the end of the routine shown in FIG. 5, the program returns the step S2 shown in FIG. 3, and the above mentioned steps are repeated.

Therefore, during heating operation, the three-way valve 32 is switched as shown by a dotted arrow of FIGS. 1 and 2, and the refrigerant is circulated in the air conditioner as follows: The compressor 31 → the three-way valve 32 → the heat-radiating inner heat exchanger 33 → the receiver 36 → the expansion valve 34 → the heat-absorbing inner heat exchanger 35 → the compressor 31. Accordingly, the air led by the blower fan 37 is heated by the refrigerant passing through the heat-radiating inner heat exchanger 33. Air led by the blower fan 37 is cooled by the refrigerant passing through the heat-absorbing inner heat exchanger 35.

On the other hand, during cooling operation, the three-way valve 32 is switched as indicated by the continuous arrow in FIG. 1, and the refrigerant in the system is circulated as follows: The compressor 31 → the three-way valve 32 → the outer heat exchanger 38 → the one-way valve 70 → the heat-radiating inner heat exchanger 33 → the receiver 36 → the expansion valve 34 → the heat-absorbing inner heat exchanger 35 → the compressor 31. Accordingly, the outer heat exchanger 38 transmits the heat of the refrigerant discharged from the compressor 31 to the ambient air. Furthermore, the remaining heat of the refrigerant is transmitted to the air led by the blower fan 37 through the heat-radiating inner heat exchanger 33. The heat-absorbing inner heat exchanger 35 transmits the heat of the air led by the fan blower 37 or led by the ram pressure during the vehicle running to the refrigerant. Therefore, the air passing through the heat-radiating inner heat exchanger 33 is heated and the air passing through the heat-absorbing inner heat exchanger 35 is cooled.

Figure 6:
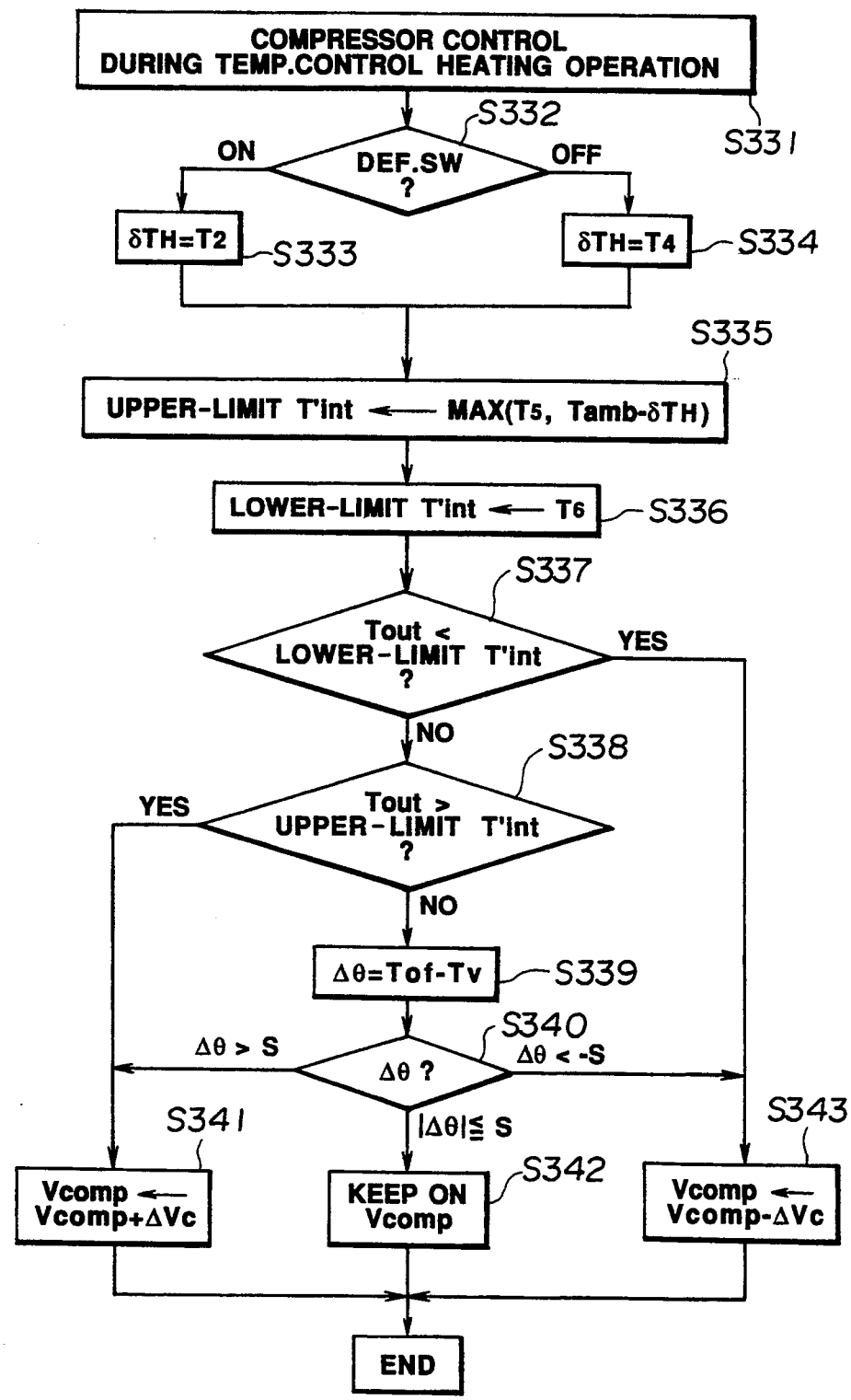

FIG. 6 shows a flow chart for a compressor control during temperature control heating operation.

In a step S331, heating operation is started, and in a step S332, it is judged whether the defroster switch is turned on or not. When the defroster switch is turned on, the program proceeds to a step S333 wherein a correction term $\delta T_H$ relative to the upper-limit cooling temperature $T_{fine}$ of the heat-absorbing inner heat exchanger 35 is set at $T_2$. When the defroster switch is turned off, the program proceeds to a step S334 wherein the correction term $\delta T_H$ is set at $T_4$. Although in the first embodiment the correction is implemented only relative to the ON/OFF condition of the defroster switch, it will be understood that such a correction may be implemented relative to the solar radiation amount, the compartment air temperature, the ambient air temperature, and the outlet air temperature into the passenger compartment.

In a step S335, the preset upper-limit cooling temperature $T_5$ under a low ambient air temperature condition and the upper-limit cooling temperature $T_{fine}$ on the basis of the ambient air temperature $T_{amb}$ are compared, and a larger one of them is determined as an upper-limit cooling temperature (upper $T'_{int}$) during heating operation. Although in the first embodiment the ambient air temperature is representatively used as a factor for determining the upper-limit cooling temperature, it will be understood that the thermal condition of the automotive vehicle or an output from a window-clouding sensor may be used as a factor for determining the upper-limit cooling temperature.

In a step S336, the preset temperature $T_{set0}$ ($T_6$) on the basis of the freezing of the heat-absorbing inner heat exchanger 35 is set as the lower-limit cooling temperature (lower-limit $T'_{int}$).

In a step S337, it is judged whether or not the outlet air temperature $T_{out}$ of the heat-absorbing inner heat exchanger 35 is lower than the lower-limit cooling temperature (lower-limit $T'_{int}$). When the judgment in the step S337 is "YES" ($T_{out} <$ lower-limit $T'_{int}$), it is apprehended that the heat-absorbing inner heat exchanger 35 may be frozen. Accordingly, the program proceeds to a step S343 wherein the workload of the compressor 31 is decreased by $\Delta V_C$ such that the outlet air temperature $T_{out}$ becomes within the range between the upper-limit and the lower-limit temperature as a result of the increase of the outlet air temperature $T_{out}$. Simultaneously, a control for increasing the inlet air temperature $T_{suc}$ of the heat-absorbing inner heat exchanger 35 is implemented in order to prevent the lowering of the outlet air temperature which is generated by the decrease of workload of the compressor 31.

When the judgment in the step S337 is "NO" ($T_{out}$lower-limit $T'_{int}$), the program proceeds to a step S338 wherein it is judged whether or not the outlet air temperature $T_{out}$ of the heat-absorbing inner heat exchanger 35 is larger than the upper-limit cooling temperature (upper-limit $T'_{int}$). When the judgment in the step S338 is "YES" ($T_{out} >$ upper-limit $T'_{int}$), the program proceeds to a step S341 wherein the workload of the compressor 31 is increased by $\Delta V_C$ to lower the outlet air temperature $T_{out}$ of the heat-absorbing inner heat exchanger 35 for the purpose of the insurance of a predetermined dehumidification amount of the conditioned air. When the judgment in the step S338 is "NO" ($T_{out} \leq$ upper-limit $T'_{int}$), the program proceeds to a step S339 wherein a difference $\Delta\theta$ between the target conditioned-air temperature $T_{of}$ and the outlet air temperature $T_y$ of the heat-radiating inner heat exchanger 33 is calculated.

In a step S340, the difference $\Delta\theta$ is compared with a preset value S. When $\Delta\theta > S$, that is, when the outlet air temperature $T_y$ does not reach the target conditioned-air temperature $T_{of}$, the program proceeds to a step S341 wherein the workload of the compressor 31 is increased by $\Delta V_C$ in order to raise the outlet air temperature $T_y$. When $\Delta\theta < -S$, that is, when the outlet air temperature $T_{out}$ of the heat-absorbing inner heat exchanger 35 is higher than the target outlet air temperature $T_{of}$, the program proceeds to a step S343 wherein the workload of the compressor 31 is decreased by $\Delta V_C$ in order to lower the outlet air temperature $T_y$ of the heat-absorbing inner heat exchanger 35. When $|\Delta\theta| \leq S$, that is, when the outlet air temperature $T_y$ is within a predetermined range, the program proceeds to a step S342 wherein the workload of the compressor 31 is kept on as it S.

With the first embodiment of the heat pump type air conditioner according to the present invention, it becomes possible to continuously implement heating operation without being effected by the ambient air temperature, and the predetermined change of the workload of the compressor 31 generates a predetermined change of the outlet air temperature without being effected by the ambient air temperature or the running condition of the vehicle. Furthermore, dehumidification (cooling) is always implemented during heating operation. Accordingly, by the compressor control shown in FIG. 6, it becomes possible to implement the dehumidification temperature control which does not generate unstable phenomenon.

Figure 7:
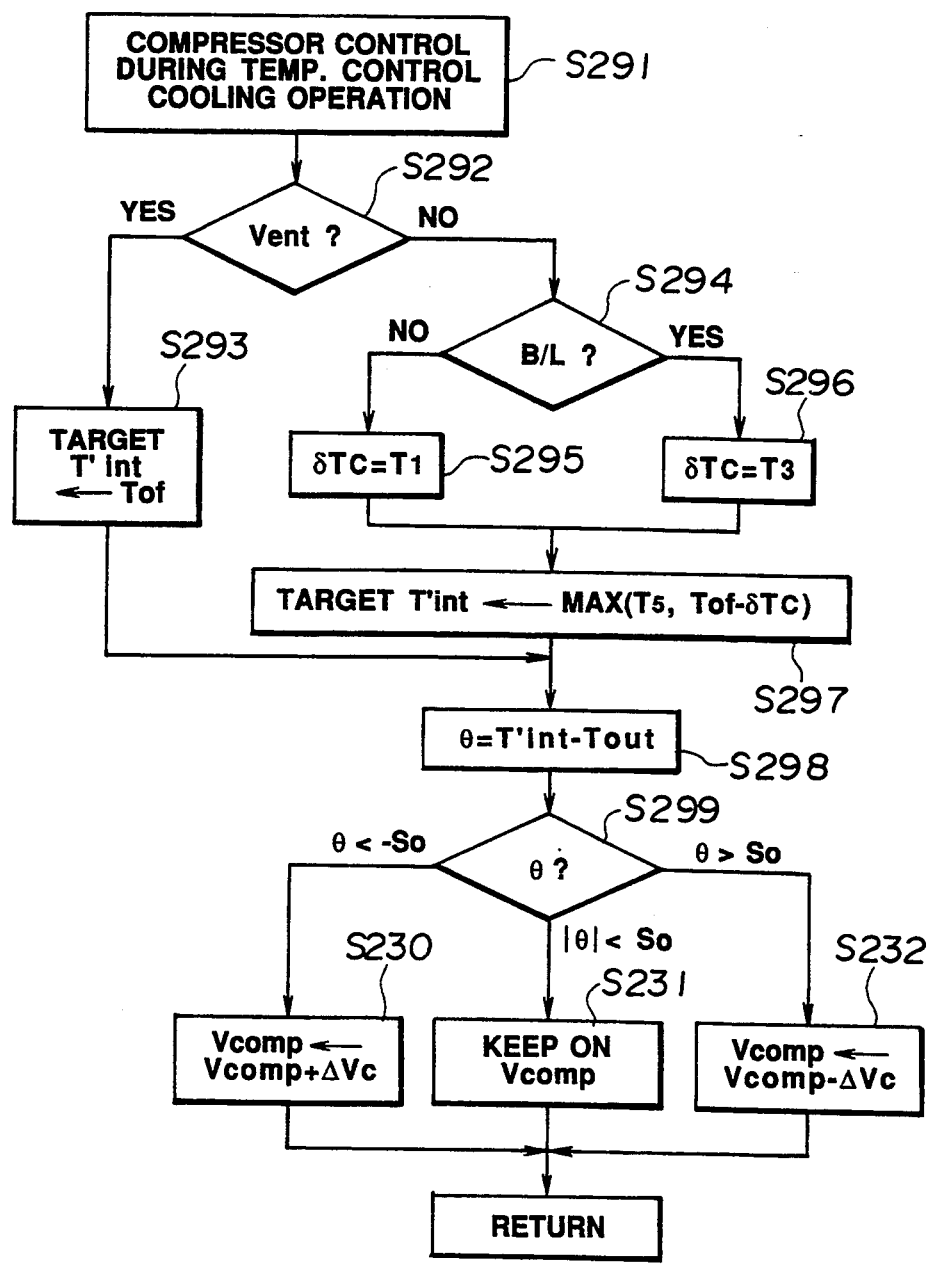
Figure 8:
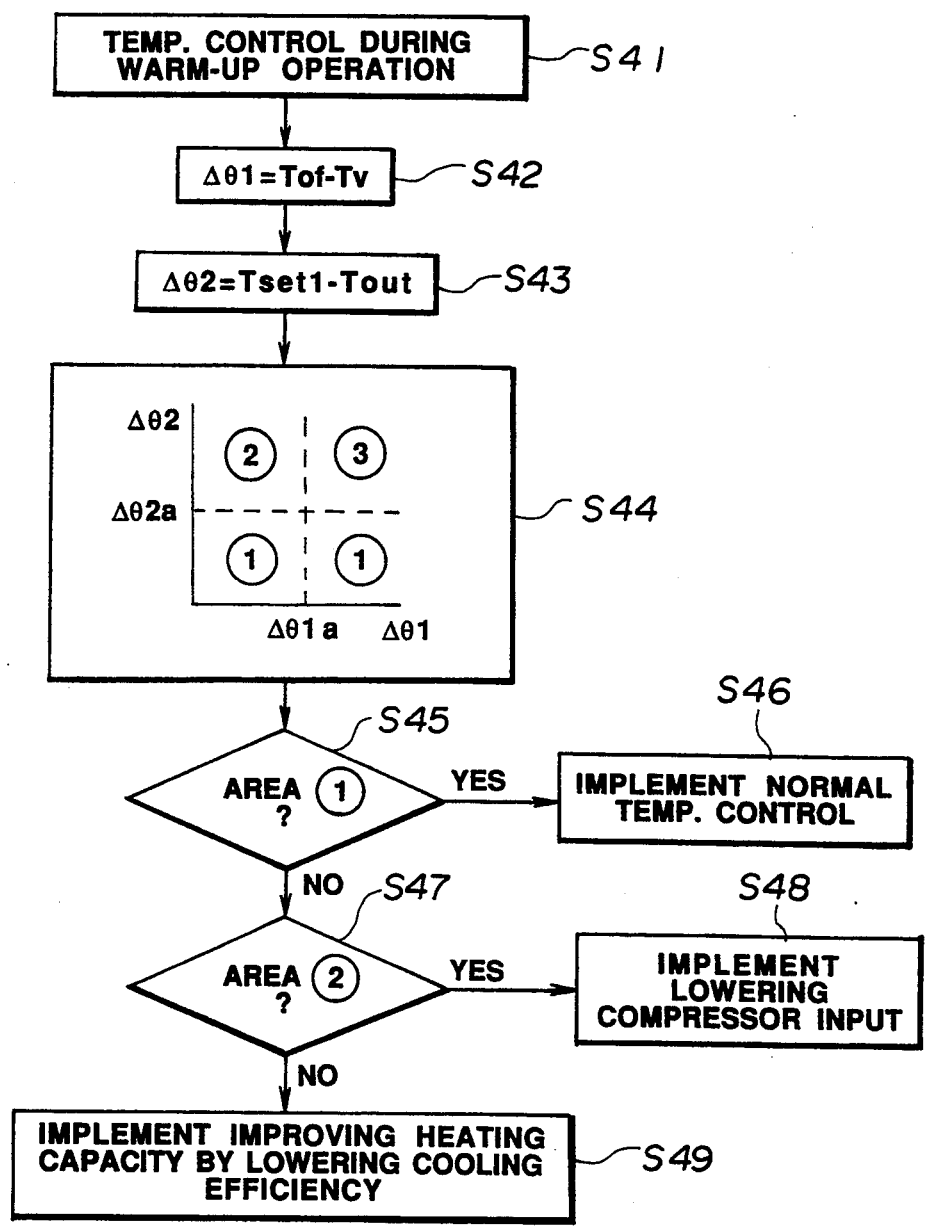

FIG. 7 shows a flow chart of the compressor control during cooling operation.

In a step S291, the cooling operation is started. Following this, in a step S292, it is judged whether the vent mode is selected or not. When the judgment in the step S292 is "YES", the program proceeds to a step S293 wherein the target outlet air temperature $X_M(T_{of})$ is set as the target temperature $T'_{int}$ of the outlet air temperature $T_{out}$ of the heat-absorbing inner heat exchanger 35. When the judgment in the step S292 is "NO", the program proceeds to a step S294 wherein it is judged whether the bi-level mode is selected or not. When the judgment in the step S294 is "YES", the program proceeds to a step S296 wherein a correction term $\delta T_c$ of the outlet air temperature $T_{out}$ is set at $T_3$. When the judgment in the step S294 is "NO", the program proceeds to a step S295 wherein the correction term $\delta T_c$ is set at $T_1$. The correction term $\delta T_c$ is increased according to the increase of the reheating amount by the heat-radiating inner heat exchanger 33.

In a step S297, the target temperature $T'_{int}$ of the outlet air temperature of the heat-absorbing inner heat exchanger 35 is set at a value which is a larger one of the temperature $T_5$ used in the step S1465 and the temperature $(T_{of}-\delta T_c)$ corrected in the step S296.

In a step S298, a difference $\theta$ between the target temperature $T'_{int}$ calculated in the step S293 or step S297 and the outlet air temperature $T_{out}$ of the heat-absorbing inner heat exchanger 35 is calculated.

In a step S299, the difference $\theta$ calculated in the step S298 is compared with a preset value $S_0$. When $\theta < -S_0$, the program proceeds to a step S230 wherein the workload of the compressor 31 is increased by $\Delta V_C$ in order to lower the outlet air temperature $T_{out}$ of the heat-absorbing inner heat exchange 35. When $\theta > S_o$, it is judged that the workload of the compressor 31 is larger than a necessary amount. Accordingly, the program proceeds to a step S232 wherein the workload of the compressor 31 is decreased by $\Delta V_C$. When $|\theta| \leq S0$, the workload of the compressor 31 is kept on as it is.

Accordingly, during heating operation, the three-way valve 32 is switched as indicated by the dotted arrow in FIG. 1, and the refrigerant is circulated as follows: The compressor 31 → the three-way valve 32 → the heat-radiating inner heat exchanger 33 → the receiver 36 → the expansion valve 34 → the heat-absorbing inner heat exchanger 35 → the compressor 31. Accordingly, the air led by the blower fan 37 or by ram pressure during the vehicle cruising is heated by the refrigerant passing through the heat-radiating inner heat exchanger 33. The air led by the blower fan 37 or by ram pressure during the vehicle cruising is cooled by the refrigerant passing through the heat-absorbing inner heat exchanger 35.

On the other hand, during cooling operation, the three-way valve 32 is switched as indicated by the continuous arrow in FIG. 1, and the refrigerant in the system is circulated as follows: The compressor 31 → the three-way valve 32 → the outer heat exchanger 38 → the one-way valve 70 → the heat-radiating inner heat exchanger 33 → the receiver 36 → the expansion valve 34 → the heat-absorbing inner heat exchanger 35 → the compressor 31. Accordingly, the outer heat exchanger 38 transmits the heat of the refrigerant discharged from the compressor 31 into the atmosphere. Furthermore, the remaining heat of the refrigerant is transmitted to the air led by the blower fan 37 or by the ram pressure during the vehicle cruising through the heat-radiating inner heat exchanger 33. The heat-absorbing inner heat exchanger 35 transmits the heat of the air led by the blower fan 37 or by the ram pressure during the vehicle running to the refrigerant. Therefore, the air passing through the heat-radiating inner heat exchanger 33 is heated and the air passing through the heat-absorbing inner heat exchanger 35 is cooled.

That is to say, during heating operation, the heat amount absorbed by the heat-absorbing inner heat exchanger 35 and the workload corresponding to the real input value $W_{comp}$ of the compressor 31 are radiated from the heat-radiating inner heat exchanger 33 after the starting of the compressor 31. Accordingly, the air, whose temperature is higher than the inlet air temperature $T_{suc}$ of the heat-absorbing inner heat exchanger 35, is fed to the passenger compartment. That is to say, with the lapse of operating period, the inlet air temperature $T_{suc}$ is increased, and the real input value $W_{comp}$ of the compressor 31 is increased due to the control of the intake door 42. Accordingly, the passenger compartment is acceleratedly heated. Since the air passing through the heat-absorbing inner heat exchanger 35 is fed to the heat-radiating inner heat exchanger 33, the efficiency of the compressor 31 is kept optimum in a manner to determine the real input value $W_{comp}$ of the compressor 31 within a range where the freezing of the heat-absorbing inner heat exchanger 35 does not cause relative to the heat load of the air fed to the heat-absorbing inner heat exchanger 35.

FIGS. 8 to 14 show flow charts for a temperature control during warm-up operation.

In a step S41, the temperature control for improving the heating capacity is implemented in response to the judgment that the warm-up operation is necessary.

In a step S42, the value $\Delta\theta_1$ is obtained by subtracting the outlet air temperature $T_v$ from the target outlet air temperature $T_{of}$ obtained in the step S5 ($\Delta\theta_1 = T_{of}-T_v$).

In a step S43, the value $\Delta\theta_2$ is obtained by subtracting the outlet air temperature $T_{out}$ from the preset temperature $T_{set0}$ on the basis of the freezing of the heat-absorbing inner heat exchanger 35.

With the provision of the values $\Delta\theta_1$ and $\Delta\theta_2$, even if the thermal load condition in the passenger compartment is changed due to the change of the solar radiation during a normal operation, it becomes possible to control the input of the compressor 31 while taking consideration with the changing condition in such a manner that the value $\Delta\theta_1$ corresponds to the change of the preset compartment air temperature and the value $\Delta\theta_2$ corresponds to the change of the thermal load to the heat-absorbing inner heat exchanger 35.

In a step S44, an area defined by the values $\Delta\theta_1$ and $\Delta\theta_2$ is divided into an area (1) where the value $\Delta\theta_2$ is smaller than or equal to a value $\Delta\theta_{2a}$; an area (2) where the value $\Delta\theta_1$ is smaller than or equal to a value $\Delta\theta_{1a}$, and the value $\Delta\theta_2$ is larger than a value $\Delta\theta_{2a}$; and an area (3) where the value $\Delta\theta_1$ is larger than the value $\Delta\theta_{1a}$, and the value $\Delta\theta_2$ is larger than the value $\Delta\theta_{2a}$. Following this, the program proceeds to a step S45.

In the area (1), the difference value $\Delta\theta_2$, which is obtained by subtracting the outlet air temperature $T_{out}$ from the preset temperature $T_{set1}$, is smaller than the value $\Delta\theta_{2a}$. That is, the heat-absorbing inner heat exchanger 35 is not frozen even if the input $W_{comp}$ of the compressor 31 is increased. Accordingly, in the area (1), the temperature control is normally implemented by increasing and decreasing of the input of the compressor 31.

In the area (2), since the value $\Delta\theta_2$ is larger than the predetermined value $\Delta\theta_{2a}$, it is apprehended that the heat-absorbing inner heat exchanger 35 is frozen. Additionally, the value $\Delta\theta_1$ is smaller than or equal to the predetermined value $\Delta\theta_{1a}$. That is, since the outlet air temperature $T_v$ of the heat-radiating inner heat exchanger 33 is near at the target outlet air temperature $T_{of}$, it is not necessary to increase the outlet air temperature $T_{out}$ by increasing the input of the compressor 31. Accordingly, in the area (2), a control to lower the input of the compressor 31 is implemented.

In the area (3), since the value $\Delta\theta_2$ is larger than the predetermined value $\Delta\theta_{2a}$, it is apprehended that the heat-absorbing inner heat exchanger 35 is frozen. Additionally, since the value $\Delta\theta_1$ is larger than the predetermined value $\Delta\theta_{1a}$, it is necessary to raise the outlet air temperature $T_v$. Therefore, in the area (3), a control, in which the outlet air temperature $T_{out}$ and the outlet air temperature $T_v$ are simultaneously raised by lowering the cooling efficiency of the refrigerant, is implemented.

Accordingly, in a step S45, it is judged whether the value $\Delta\theta 1$ obtained in the step S42 and the value $\Delta\theta_2$ obtained in the step S43 are within the area (1) or not. When the values $\Delta\theta_1$ and $\Delta\theta_2$ are within the area (1), the program proceeds to a step S46 wherein a normal temperature control is implemented. When either the value $\Delta\theta_1$ or $\Delta\theta_2$ is not within the area (1), the program proceeds to a step S47.

In the step S47, it is judged whether the value $\Delta\theta_1$ obtained in the step S43 and the value $\Delta\theta_2$ obtained in the step S43 are within the area (2) or not. When the values $\Delta\theta_1$ and $\Delta\theta_2$ are within the area (2), the program proceeds to a step S48 wherein the control to lower the input of the compressor 31 is implemented. When either the value $\Delta\theta_1$ or $\Delta\theta_2$ is not within the area (2), the program proceeds to a step S49 wherein a control to increase the heating efficiency by lowering the cooling efficiency.

Figure 9:
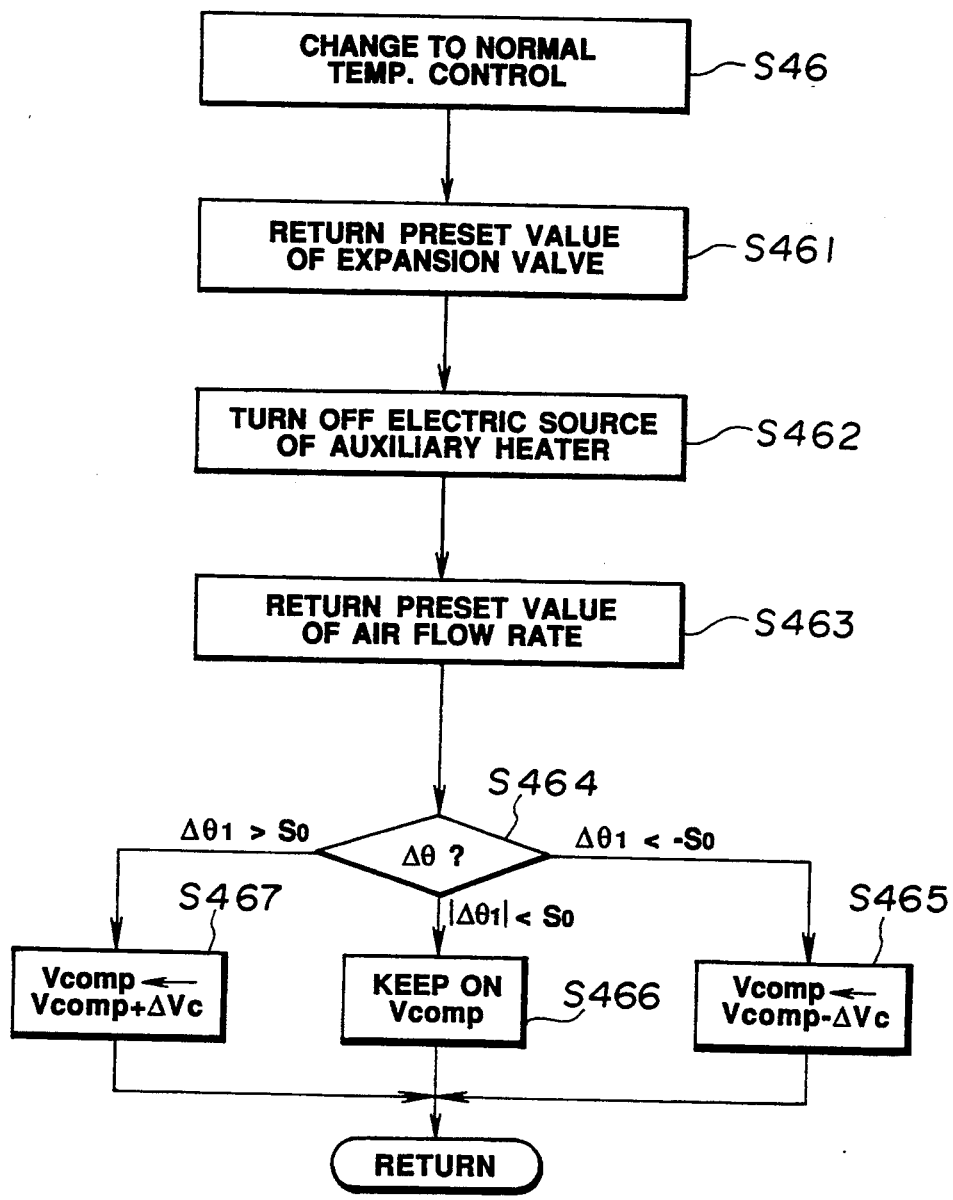

The control in the step S46 is implemented according to a flow chart shown in FIG. 9. That is, in a step S461, the setting of the expansion valve 34 is returned to a normal setting. In a step S462, the electric source of the auxiliary heater 76 is turned off. In a step S463, the setting of the air flow rate is returned to a normal setting. In a step S464, the value $\Delta\theta_1$ is compared with the preset value $S_0$. When A $\Delta\theta_1 < -S_0$, it is judged that the outlet air temperature $T_v$ is higher than the target outlet air temperature $T_{of}$, and the program proceeds to a step S465 wherein the outlet air temperature $T_v$ is lowered by decreasing the input of the compressor 31. When $\Delta\theta_1 > S_0$, it is judged that the outlet air temperature $T_v$ is lower than the target outlet air temperature $T_{of}$, and the program proceeds to a step S467 wherein the outlet air temperature $T_v$ is raised by increasing the input of the compressor 31. When $|\Delta\theta_1| \leq S_0$, the program proceeds to a step S466 wherein the input of the compressor 31 is kept on.

Figure 10:
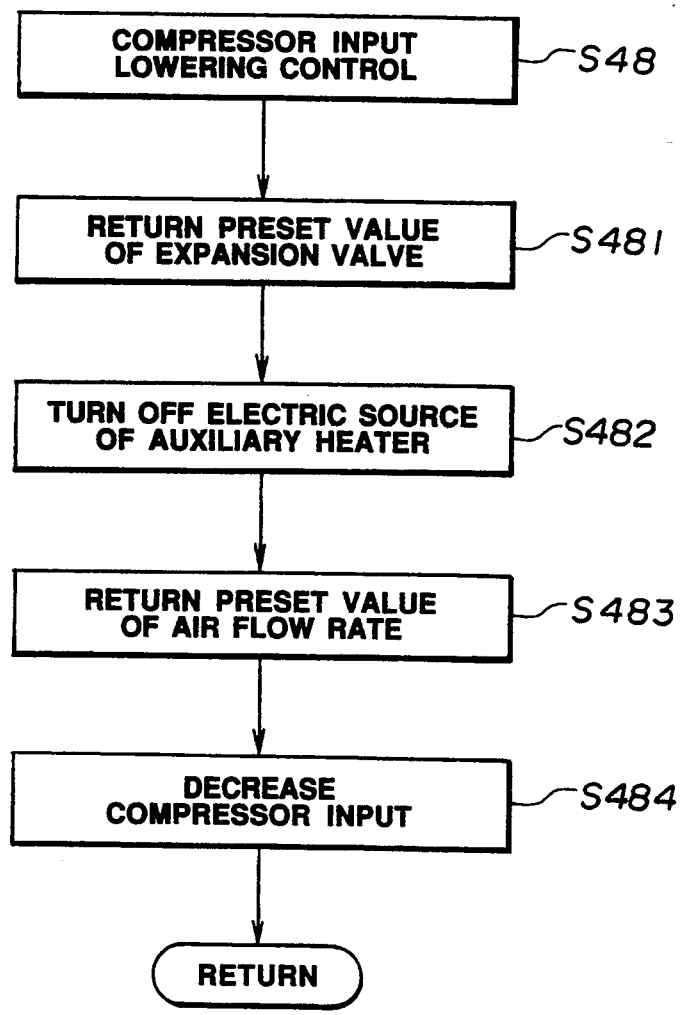

The control in the step S48 is implemented according to a flow chart shown in FIG. 10. That is, in a step S481, the setting of the expansion valve 34 is returned to a normal setting. In a step S482, the electric source of the auxiliary heater 76 is turned off. In a step S483, the setting of the air flow rate is returned to a normal setting. In a step S484, the input of the compressor 31 is decreased.

Figure 11:
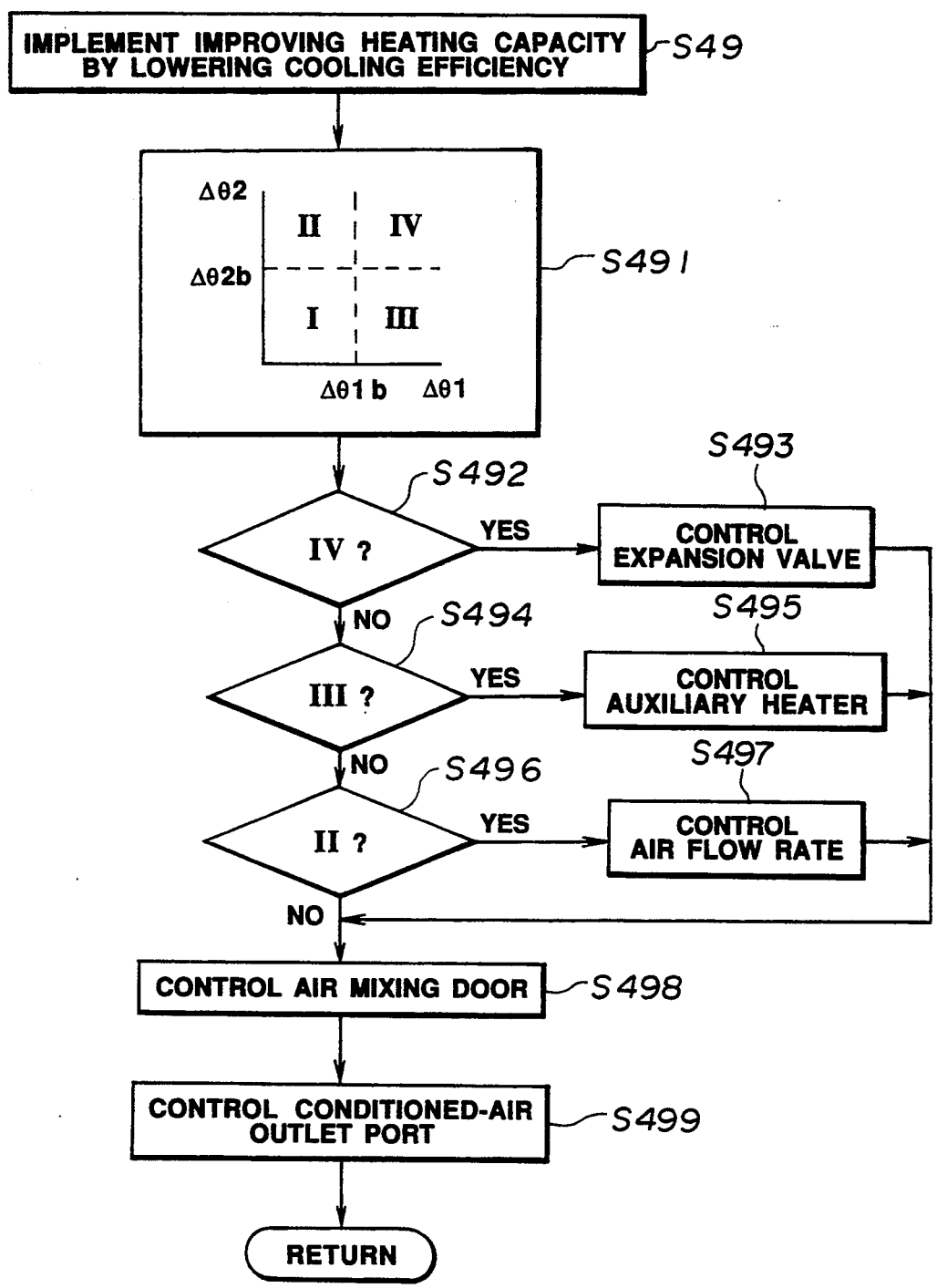

The control in the step S49 is implemented according to a flow chart shown in FIG. 11. That is, in a step S491, the area (3) is further divided into an area I where the value $\Delta\theta_1$ is smaller than a predetermined value $\Delta\theta_{1b}$ and the value $\Delta\theta_2$ is smaller than a predetermined value $\Delta\theta_{2b}$; an area II where the value $\Delta\theta_1$ is smaller than the predetermined value $\Delta\theta_{1b}$, and the value $\Delta\theta_2$ is larger than or equal to the predetermined value $\Delta\theta_{2b}$; an area III where the value $\Delta\theta_1$ is larger than or equal to the predetermined value $\Delta\theta_{1b}$, and the value $\Delta\theta_2$ is smaller than the predetermined value $\Delta\theta_{2b}$; and an area IV where the value $\Delta\theta_1$ is larger than or equal to the predetermined value $\Delta\theta_{1b}$, and the value $\Delta\theta_2$ is larger than or equal to the predetermined value $\Delta\theta_{2b}$. Following this, the program proceeds to a step S492.

In the area IV, since the value $\Delta\theta_2$, which is obtained by subtracting the outlet air temperature $T_{out}$ from the preset temperature $T_{set1}$, is larger than the predetermined value $\Delta\theta_{2b}$, it is apprehended that the heat-absorbing inner heat exchanger 35 is frozen. Further, since the difference value $\Delta\theta_1$, which is obtained by subtracting the outlet air temperature $T_v$ from the target outlet air temperature $T_{of}$, is larger than the value $\Delta\theta_{1b}$, it is necessary to raise the outlet air temperature by a large amount. Accordingly, In the area IV, a control, such that the opening degree of the expansion valve 34 is decreased and the opening degree of the air mixing door 46 is decreased, is implemented.

In the area III, since the difference value $\Delta\theta_2$ is smaller than the predetermined value $\Delta\theta_{2b}$, the possibility of the freezing of the heat-absorbing inner heat exchanger 35 is lowered in some degree. Further, since the difference value $\Delta\theta_1$ is larger than the value $\Delta\theta_{1b}$, it is necessary to raise the outlet air temperature by a large amount. Accordingly, in the area III, the auxiliary heater 76 is operated, and the opening degree of the air mixing door 46 is decreased.

In the area II, since the difference value $\Delta\theta_2$ is larger than the predetermined value $\Delta\theta_{2b}$, the freezing of the heat-absorbing inner heat exchanger 35 tends to occur. Further, since the difference value $\Delta\theta_1$ is smaller than the value $\Delta\theta_{1b}$, it is necessary to raise the outlet air temperature by a small amount. Accordingly, in the area II, the air flow rate is increased, and the opening degree of the air mixing door 46 is decreased.

In the area I, since the difference value $\Delta\theta_2$ is smaller than the predetermined value $\Delta\theta_{2b}$, the possibility of the freezing of the heat-absorbing inner heat exchanger 35 is lowered in some degree. Further, since the difference value $\Delta\theta_1$ is smaller than the value $\Delta\theta_{1b}$, it is necessary to raise the outlet air temperature by a small amount. Accordingly, in the area I, the opening degree of the air mixing door 46 is decreased.

In the step S492, it is judged whether the values $\Delta\theta_1$ and $\Delta\theta_2$ are within the area IV or not. When the values the values $\Delta\theta_1$ and $\Delta\theta_2$ are within the area IV, the program proceeds to a step S493 wherein the control of the expansion valve 34 is implemented. Following this, the program proceeds to a step S498 wherein the air mixing door 46 is controlled. When either the value $\Delta\theta_1$ or $\Delta\theta_2$ is not within the area IV, the program proceeds to a step S494.

In the step S494, it is judged whether the values $\Delta\theta_1$ and $\Delta\theta_2$ are within the area III or not. When the values $\Delta\theta_1$ and $\Delta\theta_2$ are within the area III, the program proceeds to a step S495 wherein the control of the auxiliary heater 76 is implemented. Following this, the program proceeds to the step S498. When either the value $\Delta\theta_1$ or $\Delta\theta_2$ is not within the area III, the program proceeds to a step S496.

In the step S496, it is judged whether the values $\Delta\theta_1$ and $\Delta\theta_2$ are within the area II or not. When the values $\Delta\theta_1$ and $\Delta\theta_2$ are within the area II, the program proceeds to a step S495 wherein the control of the air flow rate is implemented. Following this, the program proceeds to the step S498. When either the value $\Delta\theta_1$ or $\Delta\theta_2$ is not within the area II, the program proceeds to the step S498. Following this, the program proceeds to a step S499 wherein the control of the outlet port is implemented.

Figure 12:
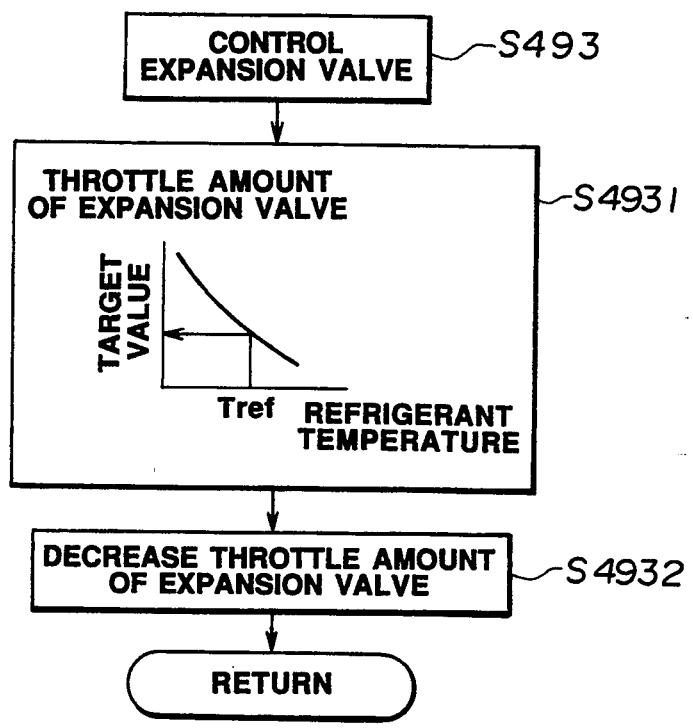

The control of the expansion valve 34 is implemented according to a flow chart shown in FIG. 12. That is, in a step S4931, the target value of the opening degree of the expansion valve is determined according to the refrigerant temperature $T_{ref}$ of the refrigerant outlet of the heat-radiating inner heat exchanger 33. In a step S4932, the opening degree of the expansion value 34 is set at the target value by outputting a control signal to the expansion valve 34. The target value of the opening degree is determined so as to become small with the lowering of the refrigerant temperature $T_{ref}$.

With the decrease of the opening degree of the expansion valve 34, the refrigerant pressure at the outlet of the expansion valve 34 is increased, and the operating pressure (evaporation pressure of the refrigerant) of the heat-absorbing inner heat exchanger 35 and the operation temperature (evaporation temperature of the refrigerant) are raised. Further, the refrigerant temperature of the refrigerant flowing into the compressor 31 is raised, and the enthalpy is increased. As a result of this, the input of the compressor 31 is efficiently increased. On the other hand, with the raising of the operation temperature of the heat-absorbing inner heat exchanger 35, the outlet air temperature of the heat-absorbing inner heat exchanger 35 and the inlet air temperature of the heat-radiating inner heat exchanger 33 are increased. Further, since the input of the compressor 31 is increased, the heat-radiating amount of the heat-radiating inner heat exchanger 33 is increased. Accordingly, the freezing of the heat-absorbing inner heat exchanger 35 is avoided and the refrigerant temperature is increased to an optimum using temperature. Furthermore, the outlet air temperature of the heat-radiating inner heat exchanger 35 is raised. Accordingly, when the air conditioner is started under a condition such that the inlet air temperature of the heat-absorbing inner heat exchanger 35 and the refrigerant temperature are low due to the low ambient temperature, the startup period of the heating operation is shortened, and it becomes possible to implement a further suitable heat operation.

Although the target value of the opening degree of the expansion valve 34 is determined from the refrigerant temperature $T_{ref}$ in the first embodiment, it will be understood that the target value may be determined from the degree of subcooling at the outlet of the heat-radiating inner heat exchanger 33 (the difference between the outlet temperature of the refrigerant and the saturated temperature at the outlet) or the superheat at the outlet of the heat-absorbing inner heat exchanger 35 (the difference between the outlet temperature of the refrigerant and the saturated temperature at the outlet pressure).

Figure 13:
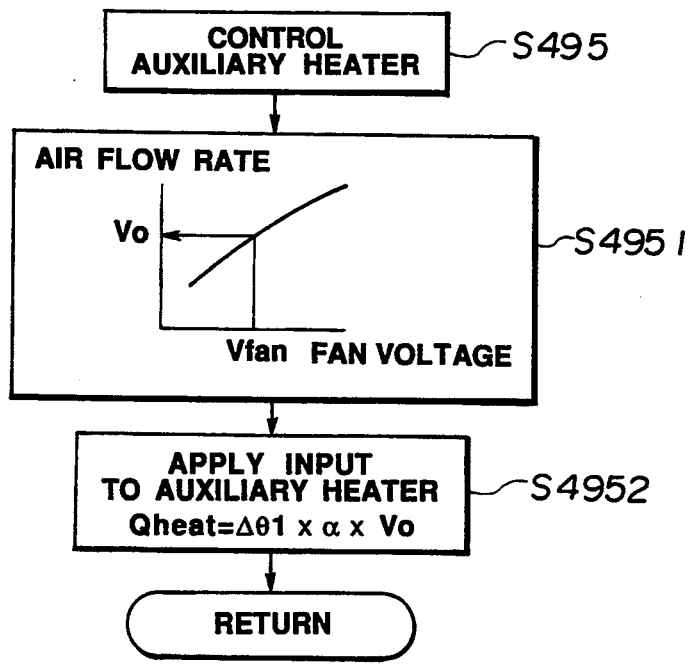

The control of the auxiliary heater 76 in the step S495 is implemented according to a flow chart shown in FIG. 13. That is, in a step S4951, the air flow rate $V_0$ corresponding to the voltage $V_{fan}$ of the blower fan motor 44 is obtained. In a step S4952, the input value $Q_{heat}$ of the auxiliary heater 76 is calculated from an equation $\Delta\theta_1 \times V_0 \times \alpha$, and a signal indicative of the input value $Q_{heat}$ is sent to the auxiliary heater 76.

With this operation of the auxiliary heater 76, the inlet air temperature of the heat-radiating inner heat exchanger 33 is increased, and the operation temperature of the heat-radiating inner heat exchanger 33 is increased. With these increases, the operation temperature and the outlet air temperature of the heat-absorbing inner heat exchanger 35 are slightly increased. Owing to the increase of the outlet air temperature of the heat-absorbing inner heat exchanger 35, an inlet amount of the auxiliary heater 76, and the increase of the operation temperature of the heat-radiating inner heat exchanger 33; it becomes possible to implement the increase of the outlet air temperature of the heat-radiating inner heat exchanger 33 prior to the increase of the refrigerant temperature.

Figure 14:
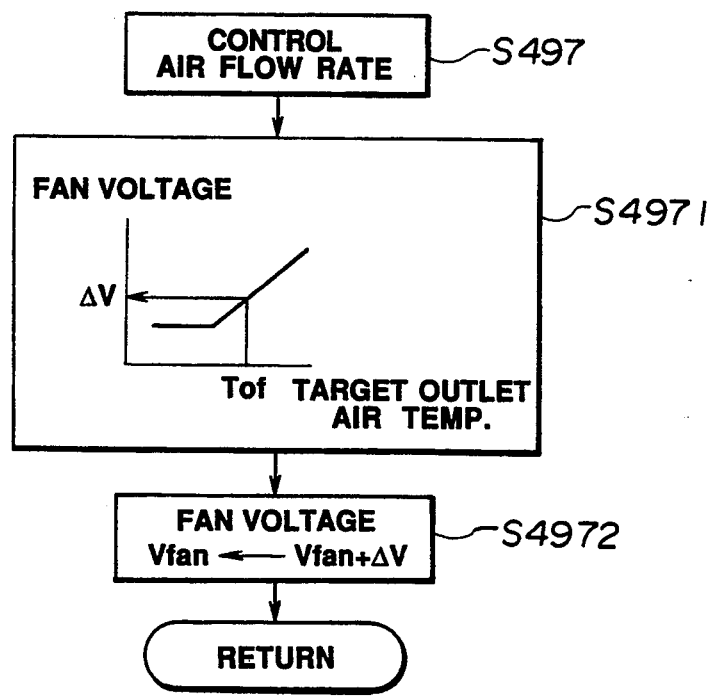

The control of the air flow rate in the step S497 is implemented according to a flow chart shown in FIG. 14. That is, in a step S4971, the correction term $\Delta V$ of the blower fan motor 44 corresponding to the target outlet air temperature $T_{of}$ is obtained. In a step S4972, the voltage $V_{fan}$ of the blower fan motor 44 is set at a value $V_{fan} + \Delta V$ in order to increase the inlet air flow rate of the heat-absorbing inner heat exchanger 35.

With the increase of the inlet air flow rate to the heat-absorbing inner heat exchanger 35, the outlet air temperature of the heat absorbing inner heat exchanger 35 is slightly increased, and the inlet air flow rate to the heat-radiating inner heat exchanger 33 and the inlet air temperature of the heat-radiating inner heat exchanger 33 are also increased. Therefore, although the outlet air temperature $T_v$ is slightly decreased or kept constant, the heat-radiating amount of the heat-radiating inner heat exchanger 33, that is, the heat-radiating amount to the passenger compartment is increased. Accordingly, the heating capacity to the passenger compartment is increased.

Figure 15:
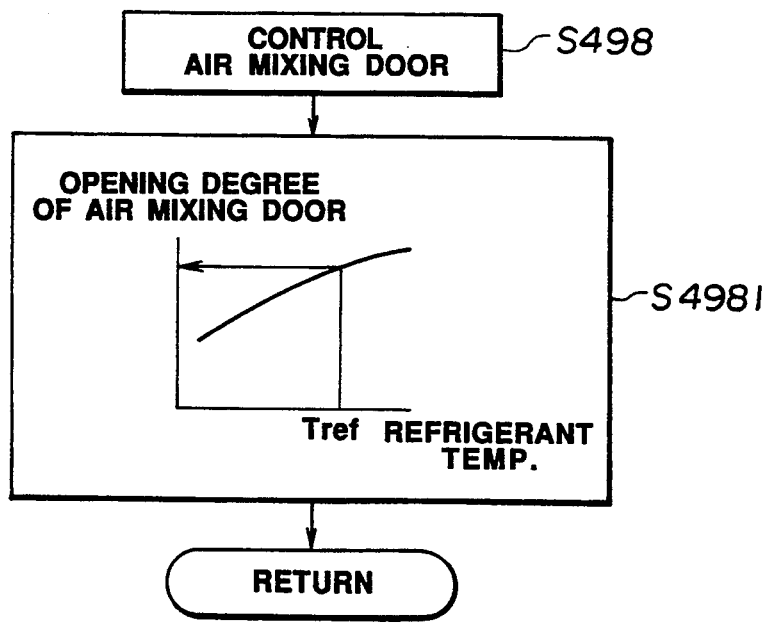

The control of the air mixing door 46 in the step S498 is implemented according to a flow chart shown in FIG. 15. That is, in a step S4981, the opening degree $X_D$ of the air mixing door 46 corresponding to the refrigerant temperature $T_{ref}$ of the outlet of the heat-radiating inner heat exchanger 33 is obtained, and the air mixing door is set to take the opening degree $X_D$. The opening degree $X_D$ is determined to be decreased with the lowering of the refrigerant temperature $T_{ref}$. When the opening degree $X_D$ of the air mixing door 46 is decreased, the refrigerant temperature from the heat-radiating inner heat exchanger 33 is increased due to the decrease of the air flow rate to the heat-radiating inner heat exchanger 33. Accordingly, it becomes possible to acceleratedly increase the input of the compressor 31.

When the refrigerant temperature $T_{ref}$ is low, the operation temperature of the heat-radiating inner heat exchanger 33 is low. Accordingly, the circulating condition of the refrigerant does not radically change even if the opening degree $X_D$ of the air mixing door 46 is largely changed. On the other hand, when the refrigerant temperature $T_{ref}$ is high, the change amount of the air mixing door 46 is set at a micro-change amount. Accordingly, the circulating condition of the refrigerant is always kept stable, and therefore it is difficult to occur a hunting phenomenon.

When the opening degree $X_D$ of the air mixing door 46 is smaller than a predetermined value, it is apprehended that the heat-radiating inner heat exchanger 33 insufficiently functions as a radiator. Accordingly, the three-way valve 32 may be unavoidably switched to the state of the cooling operation to implement the heat radiation at the outer heat exchanger 38, in order to implement the heating operation only when the opening degree $X_D$ is set at a value larger than or equal to the predetermined value.

Figure 16:
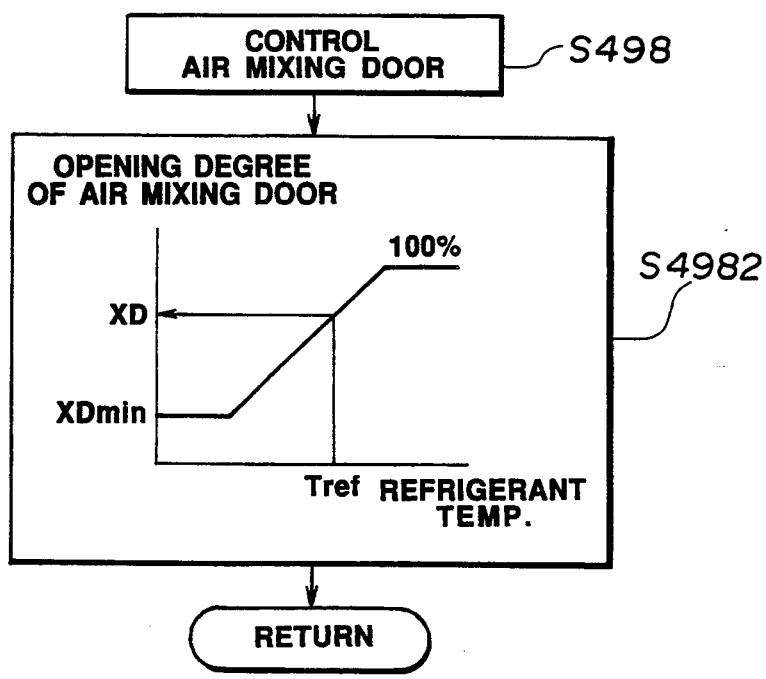

The control of the opening degree $X_D$ of the air mixing door 46 is not limited to the control shown in FIG. 15, and a control shown in a step S4982 of FIG. 16 may be applied to the operation of the air conditioner. That is, the opening degree $X_D$, under a condition that the refrigerant temperature $T_{ref}$ is lower than or equal to a predetermined temperature, is set at a minimum $X_{Dmin}$, and the opening degree $X_D$, under a condition that the refrigerant temperature $T_{ref}$ is higher than another predetermined temperature, is set at a full opening condition (maximum). Then, according to the minimum and the maximum, the control of the opening degree $X_D$ is implemented. With this control, since the opening degree $X_D$ has a value larger than the minimum $X_{Dmin}$ even if the refrigerant temperature is low, the heat-radiating inner heat exchanger 33 surely functions as a radiator. Further, by gradually increasing the opening degree $X_D$ with the increase of the refrigerant temperature, the radical increase of the operation pressure of the heat-radiating inner heat exchanger 33 is suppressed. Accordingly, it becomes possible to implement a stable temperature control.

After the implement of the steps S492 to S498 in that the cooling efficiency is lowered, the program proceeds to a step S499 wherein the opening degree control of the doors, such that the ventilator door 55, the foot door 56, the defroster door 57, and the inlet and outlet doors 74 and 75 of the circulating passage 71, are implemented. The opening degree control is implemented on the basis of the outlet air flow rate from the heat-radiating inner heat exchanger 33, that is, the opening degree $X_D$ of the air mixing door 46. For example, when the opening degree $X_D$ is smaller than a predetermined value, the ventilator door 55, the foot door 56, and the defroster door 57 are closed, and the inlet and outlet doors 74 and 75 of the circulating passage 71 are opened. That is, the conditioned-air is circulated from the air mixing chamber 47 to the upstream side of the blower fan 37, and the feeding of the conditioned air to the passenger compartment is stopped. In this system, when the opening degree of the air mixing door 46 is lower than a predetermined value at a starting time, even if the heating at the heat-radiating inner heat exchanger is sufficiently implemented, it is apprehended that almost all of the outlet air of the heat-absorbing heat exchanger 35 does not pass through the heat-radiating inner heat exchanger 33. Accordingly, the above-mentioned control is implemented in order to avoid a trouble such that the cool conditioned air is fed to the passenger compartment. With this control, at a start of the warm-up control, a comfortable heating operation is implemented without applying discomfort to passengers. Further, since the inlet air temperature of the heat absorbing inner heat exchanger 35 is increased, the operation temperature of the heat-absorbing inner heat exchanger 35 is increased, and the increase of the input of the compressor 31 is efficiently implemented.

Namely, with this embodiment according to the present invention, during heating operation, the three-way valve 32 is switched as indicated by the dotted arrow in FIG. 1, and the refrigerant is circulated as follows: The compressor 31 → the three-way valve 32 → the heat-radiating inner heat exchanger 33 → the receiver 36 → the expansion valve 34 → the heat-absorbing inner heat exchanger 35 → the compressor 31. Accordingly, the air led by the blower fan 37 or by ram pressure during the vehicle cruising is heated by the refrigerant passing through the heat-radiating inner heat exchanger 33. The air led by the blower fan 37 or by ram pressure during the vehicle cruising is cooled by the refrigerant passing through the heat-absorbing inner heat exchanger 35.

On the other hand, during cooling operation, the three-way valve 32 is switched as indicated by the continuous arrow in FIG. 1, and the refrigerant in the system is circulated as follows: The compressor 31 → the three-way valve 32 → the outer heat exchanger 38 → the one-way valve 70 → the heat-radiating inner heat exchanger 33 → the receiver 36 → the expansion valve 34 → the heat-absorbing inner heat exchanger 35 → the compressor 31. Accordingly, the outer heat exchanger 38 transmits the heat of the refrigerant discharged from the compressor 31 into the atmosphere. Furthermore, the remaining heat of the refrigerant is transmitted to the air led by the blower fan 37 or by the ram pressure during the vehicle cruising through the heat-radiating inner heat exchanger 33. The heat-absorbing inner heat exchanger 35 transmits the heat of the air led by the blower fan 37 or by the ram pressure during the vehicle running to the refrigerant. Therefore, the air passing through the heat-radiating inner heat exchanger 33 is heated and the air passing through the heat-absorbing inner heat exchanger 35 is cooled.

That is to say, during heating operation, the amount of the absorbed heat by the heat-absorbing inner heat exchanger 35 and the workload corresponding to the real input value $W_{comp}$ of the compressor 31 are radiated from the heat-radiating inner heat exchanger 33 after the starting of the compressor 31. Accordingly, the air whose temperature is higher than the inlet air temperature $T_{suc}$ of the heat-absorbing inner heat exchanger 35 is fed to the passenger compartment. That is to say, with the lapse of operating period, the inlet air temperature $T_{suc}$ is increased and the real input value $W_{comp}$ of the compressor 31 is increased due to the controlling of the intake door 42. Accordingly, the passenger compartment is acceleratedly heated. Since the air fed to the heat-absorbing inner heat exchanger 35 is fed to the heat-radiating inner heat exchanger 33, the efficiency of the compressor 31 is kept optimum in a manner to determine the real input value $W_{comp}$ of the compressor 31 within a range where the freezing of the heat-absorbing inner heat exchanger 35 does not cause relative to the heat load of the air fed to the heat-absorbing inner heat exchanger 35.

Furthermore, both the heat-radiating inner heat exchanger 33 and the heat-absorbing inner heat exchanger 35 are disposed in the passenger compartment and arranged such that during heating operation the heat-absorbing inner heat exchanger 35 absorbs heat and the heat-radiating inner heat exchanger 33 radiates heat. Accordingly, even if under a low ambient temperature, it becomes possible to implement heating operation. During warm-up control, the temperature control is implemented on the basis of the values $\Delta\theta_1$ and $\Delta\theta_2$. Accordingly, it becomes possible that the control of the input of the compressor 31 is implemented according to the change of the preset temperature by vehicle passengers or change of the heat-load condition.

Figure 17:
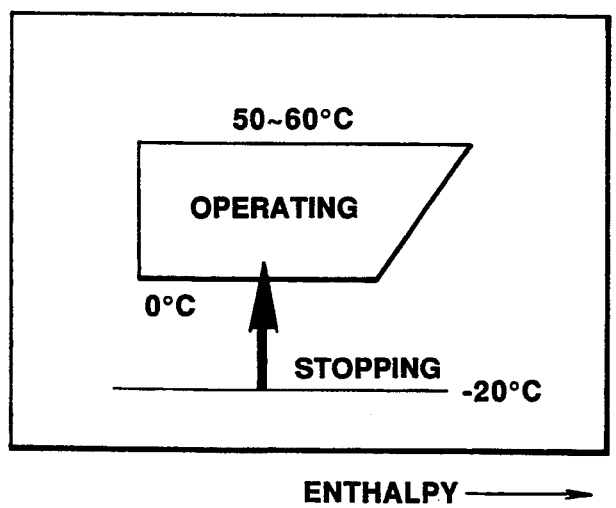

Additionally, as shown in FIG. 17, at a starting time when the refrigerant temperature is about $-20°$ C. and is not raised to a normal operation temperature (absorbing side; $0°$ C. and radiating side; $50°-60°$ C.), the expansion valve 34, the auxiliary heater 76, the blower fan 37, and the air mixing door 46 are controlled according to the operation by a vehicle passenger, heat-load condition in the passenger compartment, and the refrigerant temperature. Therefore, the cooling efficiency is lowered by an optimum method, and the refrigerant temperature and the input of the compressor 31 are increased. This shortens the startup period for heating operation.

When a predetermined time has elapsed from the starting of the air conditioner, the humidity in the passenger compartment is increased due to thawing of ice on windows and passenger's breath. Accordingly, in order to ensure the fining of the windows, the evaporation temperature of the refrigerant at the heat-absorbing inner heat exchanger 35 is maintained at about $2°$ C. Under such a condition, when the vehicle passenger changes the preset temperature to a higher value, opens the window, lowers the air flow rate, or turns on the ambient air suction switch; the input of the compressor 31 is increased by lowering the cooling efficiency of the heat-absorbing inner heat exchanger 35 if the heat-absorbing inner heat exchanger 35 tends to freeze. Accordingly, the heat-radiation amount to the passenger compartment is increased without occurring the freezing of the heat-absorbing inner heat exchanger 35.

Although this embodiment has been shown and described such that the auxiliary heater 76 is disposed at the heat-radiating inner heat exchanger 33, it will be understood that such an auxiliary heater may disposed upstream of the heat-absorbing inner heat exchanger 35 in order to lower the cooling efficiency of the heat-radiating inner heat exchanger 33. With this arrangement, the operation temperature and pressure of the heat-radiating inner heat exchanger 35 is increased by operating the auxiliary heater, and the input of the compressor 31 is increased. Further, the outlet air temperature $T_{out}$ of the heat-absorbing inner heat exchanger 35 is increased, and the inlet air temperature of the heat-radiating inner heat exchanger 33 is increased. Accordingly, the outlet air temperature $T_v$ of the heat-radiating inner heat exchanger 33 is increased. That is, it becomes possible that both the increase of the input of the compressor 31 and the heating operation at a starting time are simultaneously realized. In such a case, the control unit 43 and the auxiliary heater function as a means for once increasing the inlet air temperature of the heat-absorbing inner heat exchanger 35 and as a means for once lowering the cooling efficiency of the heat-absorbing inner heat exchanger 35.

Although the first embodiment has been shown and described such that the cooling efficiency is lowered according to the values $\Delta\theta_1$ and $\Delta\theta_2$, it will be noted that the present invention is not limited by this embodiment. Further, the lowering of the cooling efficiency by the expansion valve 34, the air mixing door 46, and the auxiliary heaters 76 and 77 may be implemented respectively and independently or implemented with combination thereof.

Referring to FIGS. 1 and 18-21, there is shown a second embodiment of the heat pump type air conditioner according to the present invention.

In the second embodiment, heating operation is divided into a stable heating mode and a warm-up mode whose heating it properties are different from each other. One of the two modes is selected according to the ambient air temperature $T_{amb}$. During the stable heating mode, the opening degree $X_{dsc}$ of the air mixing door 46 is controlled on the basis of the refrigerant temperature of a low pressure side. During the warm-up mode, the opening degree $X_{dsc}$ is controlled on the basis of the refrigerant temperature of a high pressure side.

The construction of the second embodiment is generally similar to that of the first embodiment except that the second embodiment is provided with a low-pressure refrigerant temperature sensor 101 for detecting a low-pressure side refrigerant temperature tout at the outlet of the heat-absorbing inner heat exchanger 35 and a high-pressure refrigerant temperature sensor 102 for detecting a high-pressure refrigerant temperature $t_{v,sc}$ at the inlet of the heat-radiating inner heat exchanger 33. The low-pressure refrigerant temperature sensor 101 detects a low-pressure side correlation amount of the refrigeration cycle, and the high-pressure refrigerant temperature sensor 102 detects a high-pressure side correlation amount of the refrigeration cycle. That is, the sensors 101 and 102 constitute a thermal condition detecting means. Also, the air mixing door 46 and the blower fan 44 constitute an air flow rate controlling means, and the control unit 43 constitutes a process selecting means and an air flow rate control means.

Although the second embodiment has been shown and described such that the refrigerant temperature is treated as high-pressure side and low-pressure side correlation amounts, the air temperature of the air passing through the heat-radiating inner heat exchanger 33 (the outlet air temperature $T_v$) and the air temperature of the air passing through the heat-absorbing inner heat exchanger 35 (the outlet air temperature $T_{out}$) may be used as the high-pressure side and low-pressure side correlation amounts, respectively. Since both the outlet air temperatures $T_v$ and $T_{out}$ finely show the high-pressure side and low-pressure side conditions of the refrigeration cycle, it becomes possible to implement a further fine control by this application.

Figure 18:
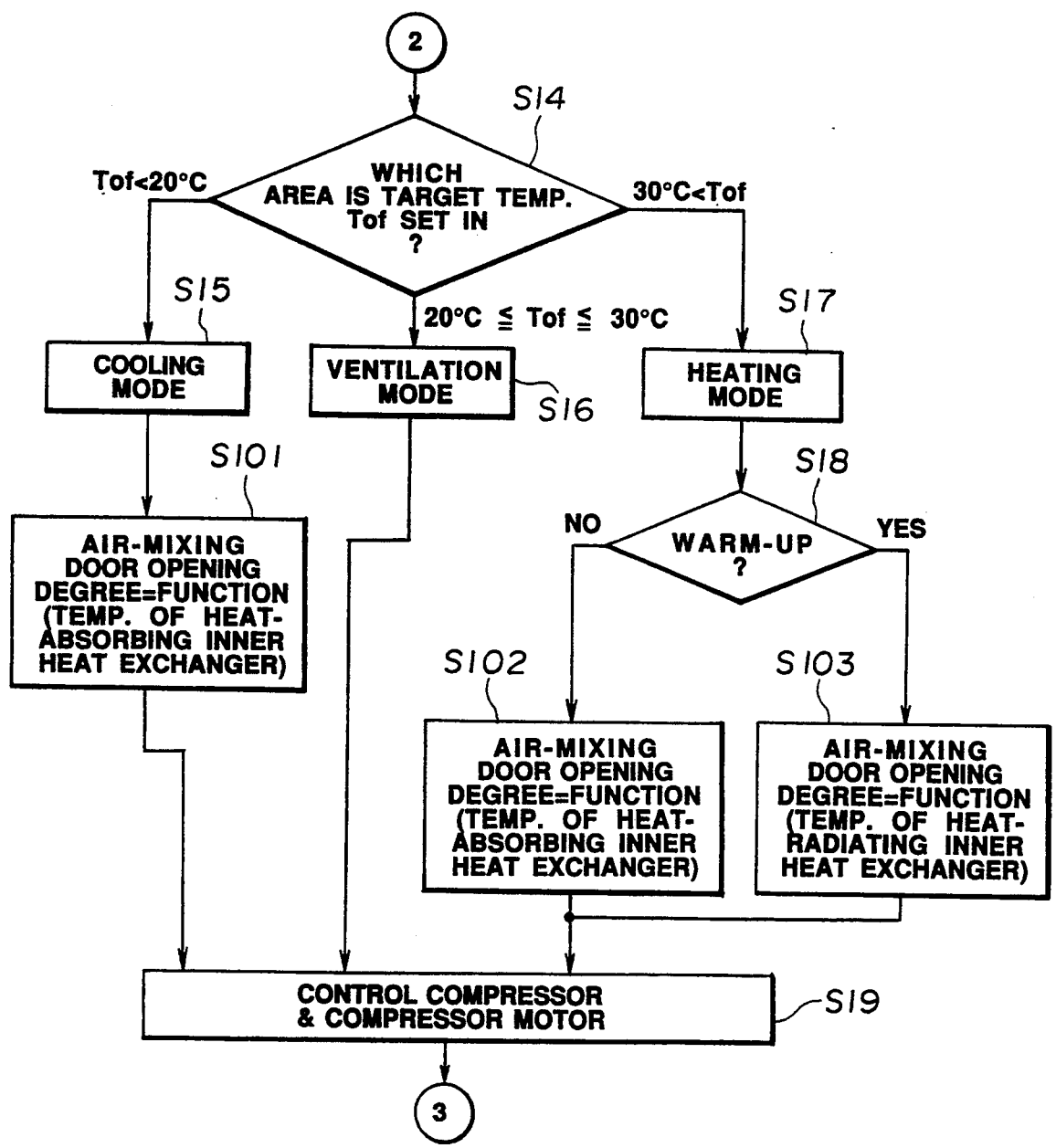
FIGS. 18 to 21 are flow charts which show controls in a second embodiment of the heat pump type air conditioner according to the present invention.

FIG. 18 shows a flow chart for the control of the second embodiment of the heat pump type air conditioner according to the present invention.

In this control, the control of the blower fan 44 and the door actuators during operation is the same as that of the first embodiment. Accordingly, the control is implemented according to the steps S1 to S4 shown in FIGS. 3 and 4. After the processing of the steps S1 to S4, the program proceeds to a step S14 shown in FIG. 18.

In the step S14, it is judged which area is the target outlet air temperature $T_{of}$ positioned in. On the basis of the judgment in the step S14, operation mode of the air conditioner is determined. That is, when the target outlet air temperature $T_{of}$ is lower than $20°$ C. ($T_{of} < 20°$ C.), the program proceeds to a step S15 wherein cooling operation is selected. When the target outlet air temperature is within the range between $20°$ C. and $30°$ C. ($20°$ C. $\leq T_{of} \leq 30°$ C.), the program proceeds to a step S16 wherein the ventilator mote is selected. When the target outlet air temperature is larger than $30°$ C.

($T_{of} > 30°$ C.), the program proceeds to a step S17 wherein heating operation is selected.

In the step S15, the three-way valve 32 is switched to the cooling operation state to flow the refrigerant from the compressor 31 to the outer heat exchanger 38, and the program proceeds to a step S101.

In the step S101, the air mixing door 46 is controlled according to a temperature of the heat-absorbing inner heat exchanger 35 as will be mentioned later, and the program proceeds to a step S19.

In the step S19, the control of the compressor 31 and the compressor motor is implemented according to the compressor control during temperature control cooling operation which is shown in the steps S291 to S301 of FIG. 7.

In the step S16, the ventilator mode, in which the heating or cooling of the conditioned air is not implemented, is implemented, and the program proceeds to the step S19 wherein the compressor 31 is stopped for stopping the refrigeration cycle, and only the feeding of the conditioned air is implemented.

In the step S17, the three-way valve 32 is switched to the heating operation state to flow the refrigerant from the compressor 31 to the heat-radiating inner heat exchanger 33, and the program proceeds to a step S18.

In the step S18, it is judged whether the warp-up control (a process for primary implementing prompt heating) should be started or not. When the judgment in the step S18 is "YES", the program proceeds to a step S102. When the judgment in the step S18 is "NO", the program proceeds to a step S103.

In the step S102, the air mixing door 46 is controlled according to the temperature of the heat-absorbing inner heat exchanger 35, as is similar to the step S101. That is, when the low-pressure side refrigerant temperature $t_{out}$ is high, the opening degree $X_{dsc}$ is increased. When it is low, the opening degree $X_{dsc}$ is decreased. With this control, the circulating condition of the refrigerant during heating operation becomes stable, and the heating operation is comfortably implemented.

In the step S103, the opening degree $X_{dsc}$ is controlled according to the temperature of the heat-radiating inner heat exchanger 33 as will be discussed later, and the program proceeds to the step S 19.

In the step S19, the control of the compressor 31 and the compressor motor is implemented according to the compressor control during temperature control heating operation which is shown in the steps S331 to S343 of FIG. 6.

After the routine from the step S14 to the step S19 is once implemented, the program returns to the step S2 and is repeated.

Figure 19:
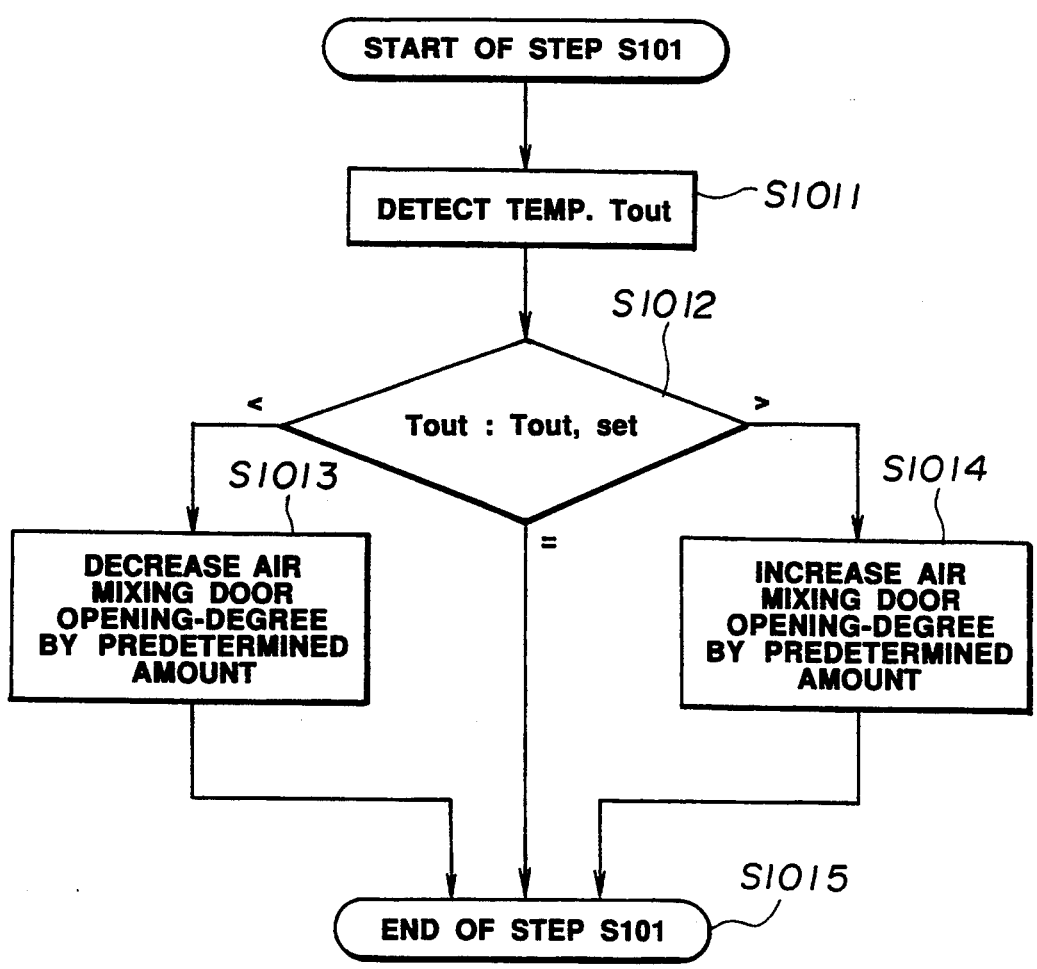

FIG. 19 shows the control of the opening degree of the air mixing door 46 which starts from the step S101.

In a step S1011, the low-pressure refrigerant temperature $t_{out}$, which is the refrigerant temperature of the outlet of the heat-absorbing inner heat exchanger 36, is detected, and the program proceeds to a step S1012.

In the step S1012, the low-pressure side refrigerant temperature $t_{out}$ is compared with a preset temperature $t_{out,set}$. When the low-pressure refrigerant temperature $t_{out}$ is lower than the preset temperature $t_{out,set}$, the program proceeds to a step S1013. When the refrigerant temperature $t_{out}$ is higher than the preset temperature $t_{out,set}$, the program proceeds to a step S1014. When equal to the preset temperature $t_{out,set}$, the program proceeds to a step S1015 wherein the control of the air mixing door 46 is achieved.

In a step S1013, the opening degree $X_{dsc}$ of the air mixing door 46 is decreased by a predetermined amount, and the program proceeds to the step S1015. In the step S1014, the opening degree $X_{dsc}$ is increased by the predetermined amount, and the program proceeds to the step S1015.

With the above-mentioned control, when the air flow rate to the heat-radiating inner heat exchanger 33 is increased, the heat radiating amount of the refrigerant in the refrigeration cycle is increased. Accordingly, the heat absorbing amount at the heat-absorbing inner heat exchanger 35 is increased, and therefore the temperature of the heat-absorbing inner heat exchanger 35 is increased. On the other hand, when the air flow rate to the heat-radiating inner heat exchanger 33 is decreased, the heat radiating amount of the refrigerant in the refrigeration cycle is deceased. Accordingly, the heat absorbing amount of the refrigerant in the heat-absorbing inner heat exchanger 35 is decreased, and therefore the temperature of the heat-absorbing inner heat exchanger 35 is increased. That is, when the low-pressure refrigerant temperature $t_{out}$ is high, the heat-absorbing inner heat exchanger 35 is kept at a high temperature condition. Accordingly, the opening degree $X_{dsc}$ of the air mixing door 46 is increased in order to avoid the increase of the temperature of the heat-absorbing inner heat exchanger 35. When the low pressure refrigerant temperature $t_{out}$ is low, the opening degree $X_{dsc}$ of the air mixing door 46 is decreased. With this control, the heat-absorbing inner heat exchanger 35 is maintained at an optimum temperature condition. Therefore, the condition of a refrigeration cycle during cooling operation becomes stable, and the suitable cooling operation is implemented.

Figure 20:
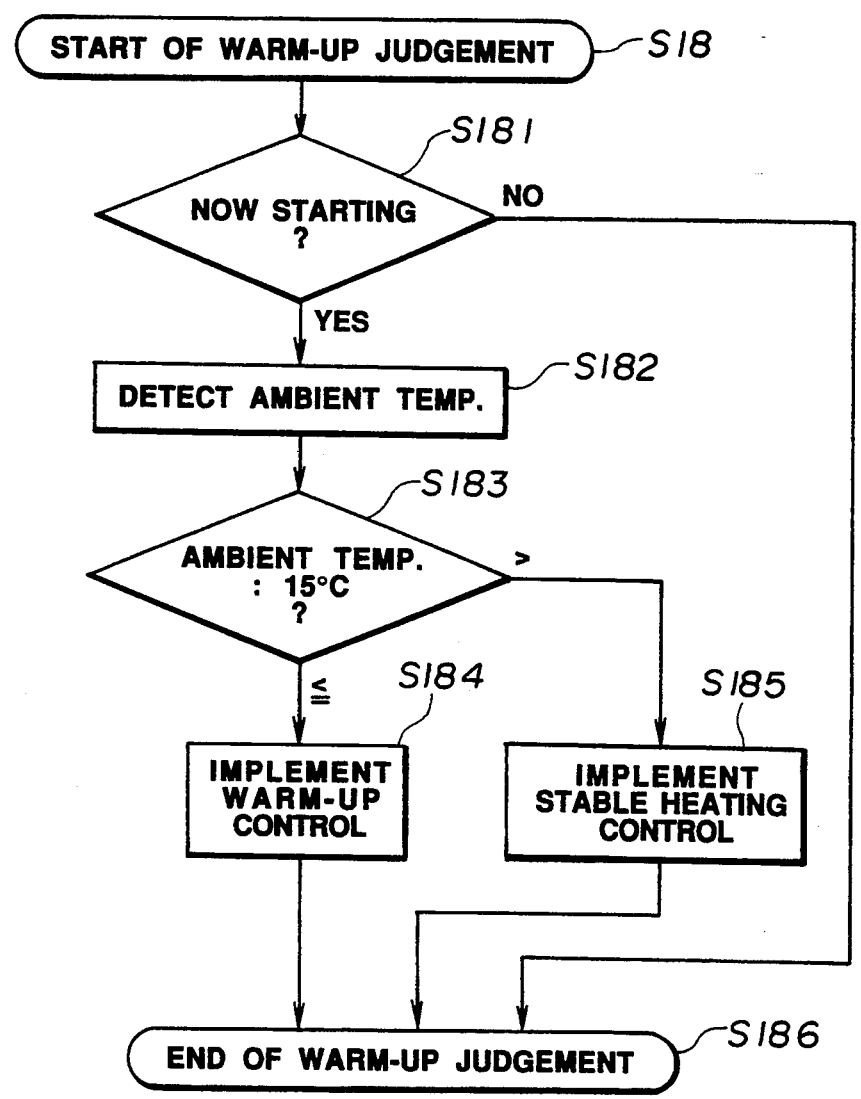

FIG. 20 shows a judgment process where it is judged whether the warm-up operation is necessary or not. Such a judgment process is implemented on the basis of the thermal information of the vehicle at the starting of the refrigeration cycle. More particularly, when the ambient air temperature $T_{amb}$ or the compartment air temperature $T_{room}$ is lower than or equal to a predetermined temperature, it is judged that the warm-up control should be implemented.

In a step S181, it is judged whether the refrigeration cycle is now starting or not. When the judgment in the step S181 is "YES", the program proceeds to a step S182. When the judgment in the step S181 is "NO", the program proceeds to a step S186.

In the step S182, the ambient air temperature $T_{amb}$ is detected, and the program proceeds to a step S183.

In the step S183, it is judged whether the ambient air temperature $T_{amb}$ is higher than a preset temperature, such as 15° C. When the ambient air temperature $T_{amb}$ is higher than 15° C. ($T_{amb} > 15°$ C.), the program proceeds to a step S185 wherein the stable heating control under a normal condition (a process for primarily implementing window-fining) is implemented. When the ambient air temperature $T_{amb}$ is lower than or equal to 15° C. ($T_{amb} \leq 15°$ C.), the program proceeds to a step S184 wherein the warm-up control is implemented. Then, the program proceeds to the step S186 wherein the judgment process is achieved.

Figure 21:
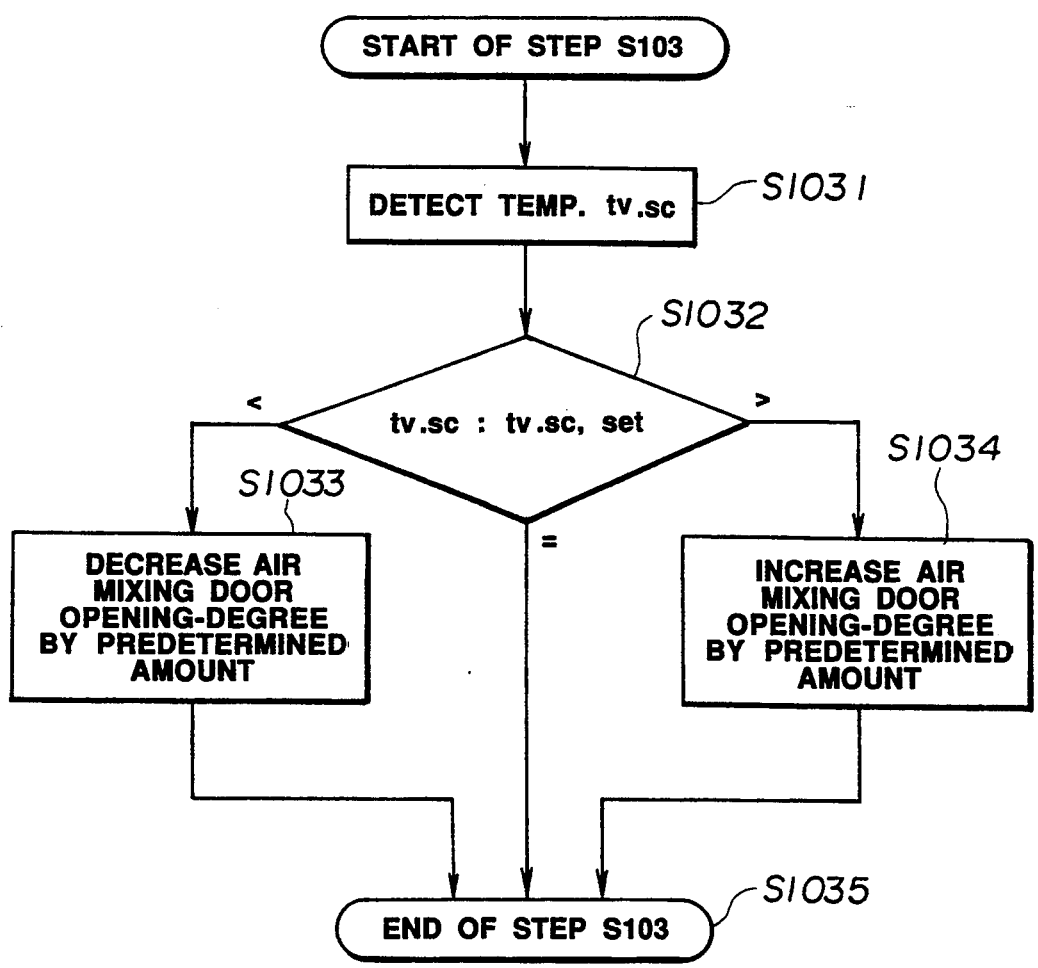

FIG. 21 shows a flow chart for controlling the opening degree of the air mixing door 46 during the heating operation which control is in the step S103.

In a step S1031, the high-pressure side refrigerant temperature $t_{v,sc}$ is detected, and then, the program proceeds to a step S 1032.

In the step S1032, the high-pressure refrigerant temperature $t_{v,sc}$ is compared with a preset temperature $t_{v,sc,set}$. When the temperature $t_{v,sc}$ is lower than the preset temperature $t_{v,sc,set}$, the program proceeds to a step S1033. When the temperature $t_{v,sc}$ is higher than the preset temperature $t_{v,sc,set}$, the program proceeds to a step S1034. When the temperature $t_{v,sc}$ is equal to the preset temperature $t_{v,sc,set}$, the program proceeds to a step S1035 wherein the control of the step S103 is achieved.

In the step S1033, the opening degree $X_{dsc}$ of the air mixing door 46 is decreased by a predetermined amount. In the step S1034, the opening degree $X_{dsc}$ is increased by the predetermined amount. Then, the program proceeds to the step S1035.

In general, when the air flow rate to the heat-radiating inner heat exchanger 33 is increased under a condition that the high-pressure refrigerant temperature $t_{v,sc}$ is not sufficiently high, such as under the warm-up control condition, the heat-radiating amount of the refrigerant in the refrigeration cycle is increased. Accordingly, it takes a long time in order to raise the high-pressure refrigerant temperature $t_{v,sc}$ to the predetermined temperature. In contrast, with this control of the air mixing door 46 according to the temperature (the high pressure refrigerant temperature $t_{v,sc}$)of the heat-radiating inner heat exchanger 33, when the high pressure refrigerant temperature $t_{v,sc}$ is low, the high-pressure refrigerant temperature $t_{v,sc}$ is increased prior to the increase of the conditioned air. Accordingly, the opening degree $X_{dsc}$ of the air mixing door 46 is increased. When the high-pressure refrigerant temperature $t_{v,sc}$ is high, the opening degree $X_{dsc}$ of the air mixing door 46 is increased in order to rapidly raise the temperature of the conditioned air.

Therefore, even if the temperature of the heat-absorbing inner heat exchanger 35 us lower and the heating capacity is low, it becomes possible to rapidly raise the high-pressure refrigerant temperature $t_{v,sc}$ and the pressure in the refrigeration cycle. That is, the rapid heating capacity is improved. Also, since the warm-up control is implemented under a condition that the ambient air temperature $T_{amb}$ is lower than or equal to 0° C., the window-clouding does not occur even if the humidity of the air is low, the heat absorbing amount of the refrigerant in the heat-absorbing inner heat exchanger 35 is low, or the condition of the refrigerant is unstable.

In short, with the second embodiment of the air conditioner according to the present invention, during heating operation, when the ambient air temperature $T_{amb}$ is lower than the predetermined temperature at which the window-clouding is difficult to occur (such as 0° C.), the opening degree $X_{dsc}$ is controlled according to the temperature of the heat-radiating inner heat exchanger 33. Accordingly, the heat radiation from the refrigerant is suppressed, and the rapid warm-up property is improved. Further, when the ambient air temperature $T_{amb}$ is higher than the predetermined temperature, such as at 15° C., the opening degree $X_{dsc}$ of the air mixing door 46 is controlled according the temperature of the heat-absorbing inner heat exchanger 35. Accordingly, it becomes possible to stabilize the heat-absorbing condition of the refrigerant and to keep the window-fining property. Therefore, both the rapid warming property required from the amenity in the space and the window-fining property required from the security are simultaneously realized.

Figure 22:
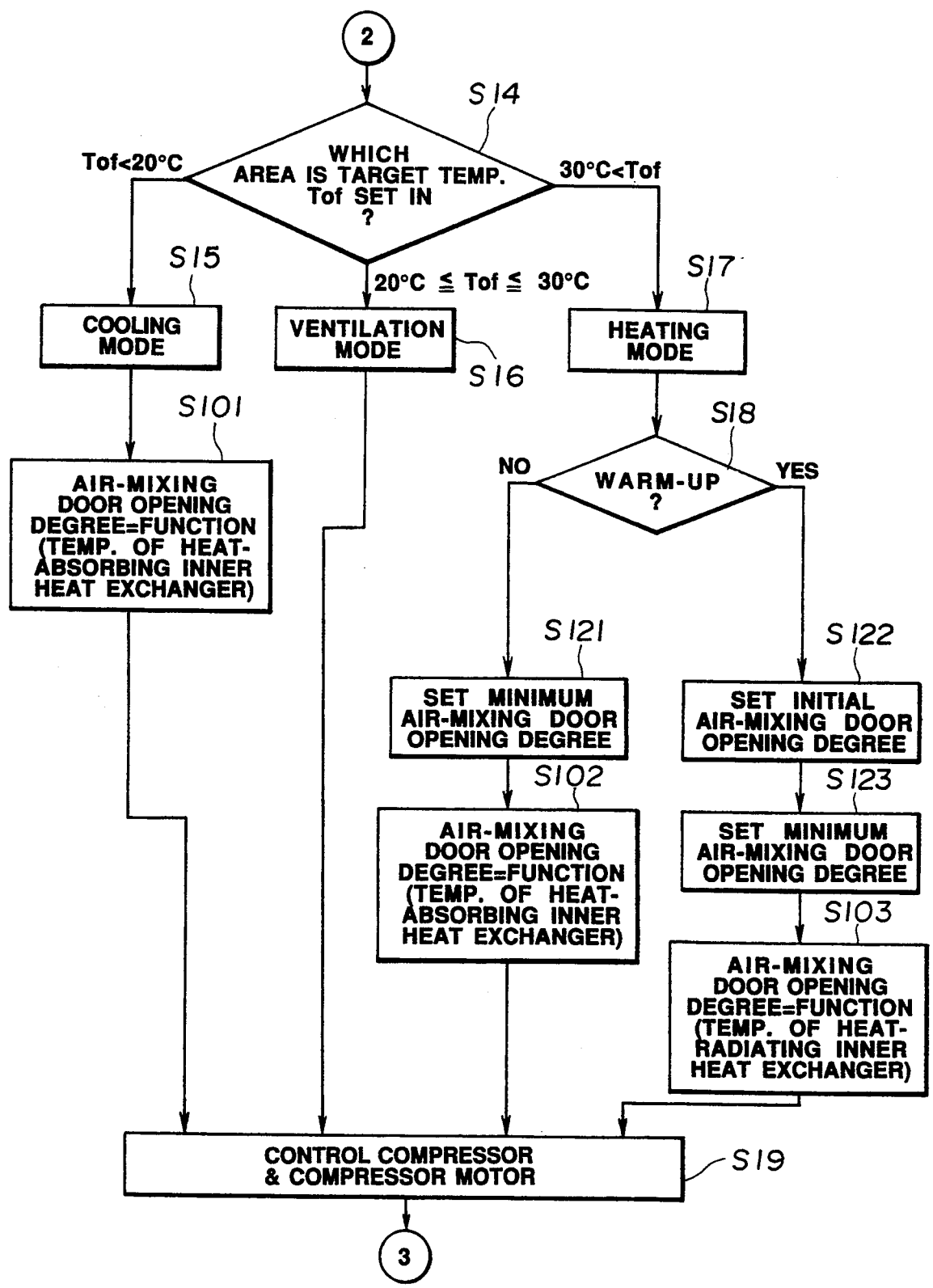
FIG. 22 is a flow chart which shows a control in a third embodiment of the heat pump type air conditioner according to the present invention.

Referring to FIGS. 1 and 22, there is shown a third embodiment of the heat pump type air condition according to the present invention.

The construction of the third embodiment is generally similar to that of the second embodiment except that during heating mode, a minimum value of the opening degree $X_{dsc}$ of the air mixing door 46 is preset such that the air flow rate to the heat-radiating inner heat exchanger 33 does not become lower than a predetermined air flow rate.

FIG. 22 shows a flow chart for the control of the third embodiment of the heat pump type air conditioner according to the present invention. In this flow chart, same steps as those of the second embodiment is indicated by same reference numerals, and their explanation are omitted in this specification.

In the step S14, operation mode is selected according to the target outlet air temperature $T_{of}$, as is similar to that in the second embodiment. When the cooling mode is selected, the program proceeds to a step S15 and a step S101 wherein the opening degree $X_{dsc}$ of the air mixing door 46 is controlled according to the temperature of the heat-absorbing inner heat exchanger 35. When the ventilation mode is selected, the program proceeds to the step S16 and a step S19 wherein the compressor 31 is controlled without the control of the opening degree $X_{dsc}$ of the air mixing door 46. When the heating mode is selected, the program proceeds to the step S18 wherein it is judged whether the warm-up control should be implemented or not. When the judgment in the step S18 is "YES", the program proceeds to a step S122. When the judgment in the step S18 is "NO", the program proceeds to the step S121.

In the step S121, a minimum opening degree $X_{min1}$ of the air mixing door 46 is set, and the opening degree $X_{dsc}$ is controlled so as not to become smaller than the minimum opening degree $X_{min1}$.

This setting of the minimum opening degree $X_{min1}$ is implemented for avoiding the following trouble:

When the air flow rate to the heat-radiating inner heat exchanger 33 is extremely decreased by extremely decreasing the opening degree $X_{dsc}$ under the warm-up operation or the stable heating operation, the pressure or temperature of the high pressure side refrigerant becomes higher than a predetermined value. Accordingly, it is apprehended that the air conditioning operation is stopped and the operating condition of the refrigeration cycle becomes unstable.

Therefore, with the above-mentioned control, the minimum opening degree $X_{min1}$ is set so as not to stop the operation of the air condition and so as to improve the stability of the stable heating operation and the warm-up operation.

After the setting of the minimum opening degree $X_{min1}$, the program proceeds to a step S102 wherein the opening degree $X_{dsc}$ is controlled according to the temperature of the heat-absorbing inner heat exchanger 35 as is similar to that in the second embodiment. Then, the program proceeds to the step S19.

In the step S122, since it is necessary to implement the warm-up operation, the initial opening degree $X_f$ of the air mixing door 46 is set just after the starting of the air conditioner. For a predetermined period, the opening degree $X_{dsc}$ of the air mixing door 46 is kept at the initial opening degree $X_f$ in order to operate the air conditioner.

The optimum amount of the air flow rate to the heat-radiating inner heat exchanger 33 just after the starting of the air conditioner becomes different due to various factors, such as the ambient air condition, the refrigerant condition, and a time period from the end of the previous operation to the start of this operation. Accordingly, the opening degree $X_{dsc}$ of the air mixing door 46 is set at the initial opening degree $X_f$ in order to rapidly and stably change the refrigerant condition at just after the starting to a normal condition, and in order to improve the rapid warming property.

In a step S123, a minimum opening degree $X_{min2}$ is set, in order to avoid the degradation of the operating condition of the refrigeration cycle when the opening degree $X_{dsc}$ is decreased and the air flow rate to the heat-radiating inner heat exchanger 33 is extremely decreased.

Following this, the program proceeds to the step S19 wherein the control of the compressor 31 and the compressor motor is implemented according to the compressor control during the temperature control heating which is shown in steps S331 to S343 of FIG. 6.

After the routine from the step S14 to the step S19 in FIG. 22 is once implemented, the program returns to the step S2 and is repeated.

With the third embodiment of the heat pump type air conditioner according to the present invention, since the opening degree $X_{dsc}$ of the air mixing door 46 during heating operation is kept so as not to become smaller than the minimum opening degrees $X_{min1}$ and $X_{min2}$, the refrigeration cycle under stable heating operation is stably kept on, and the refrigeration cycle during warm-up operation is prevented from being degraded. Furthermore, since just after the starting of warm-up operation the opening degree $X_{dsc}$ of the air mixing door is kept at the initial opening degree $X_f$, the change of the opening degree $X_{dsc}$ is small. This improves the rapid heating property. Accordingly, it becomes possible to realize both the rapid heating and the protection of the window-clouding while maintaining the refrigeration cycle in good condition.

Referring to Figs, 1 and 23, there is shown a fourth embodiment of the heat pump type air conditioner according to the present invention.

The construction of the fourth embodiment is generally similar to the third embodiment except that a minimum rotation speed of the blower fan 37 during the heating mode is determined in order to keep a total air flow rate fed to the passenger compartment so as to be larger than a predetermined air flow rate.

The blower fan 44 constitutes a means for controlling the suction air flow rate, and the air mixing door 46 constitutes a means for changing ratio of hot and cool air.

Figure 23:
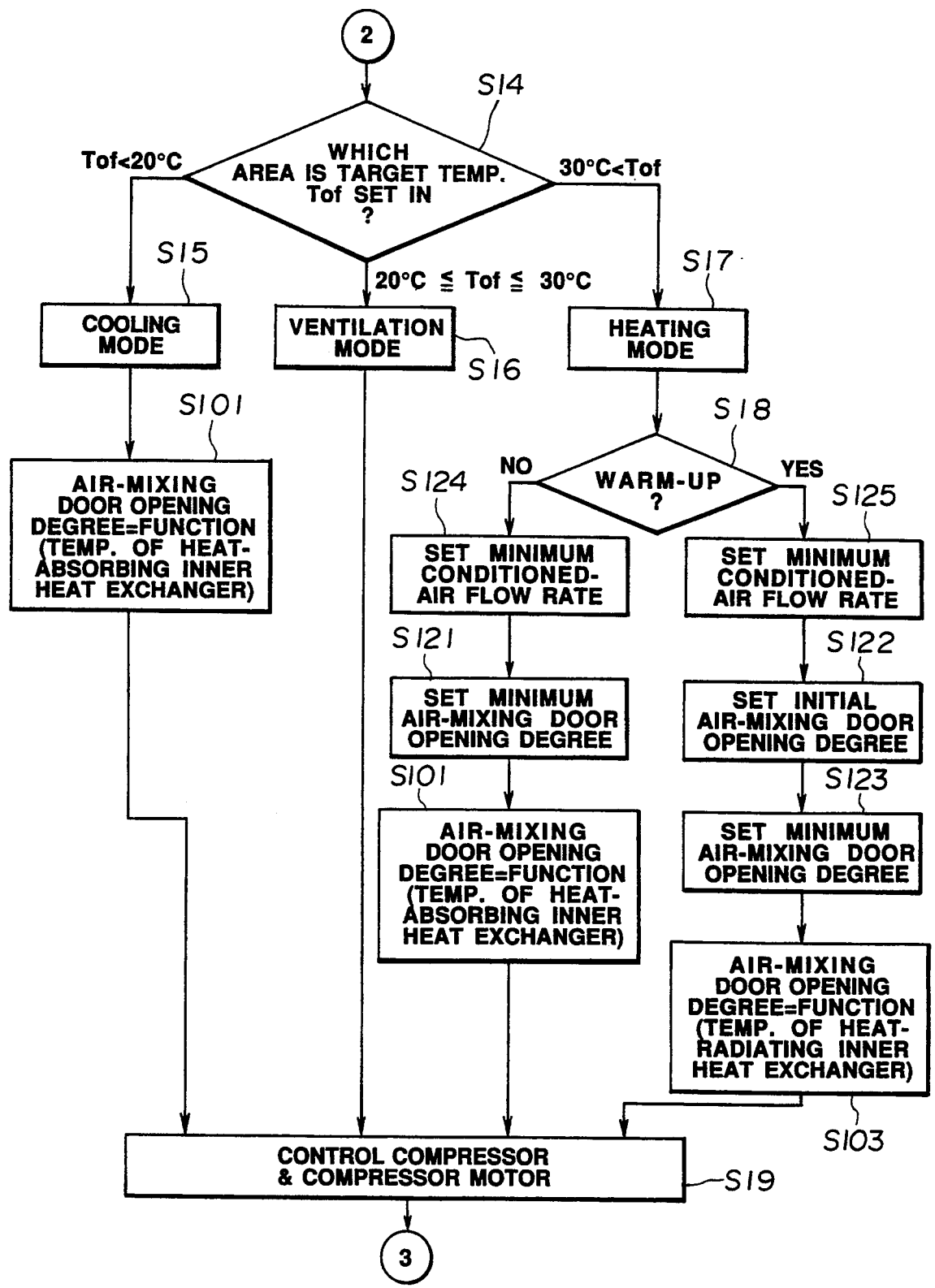
FIG. 23 is a flow chart which shows a control in a fourth embodiment of the heat pump type air conditioner according to the present invention.

FIG. 23 shows a flow chart of the fourth embodiment of the heat pump type air conditioner according to the present invention.

In this flow chart, same steps as that of the second and third embodiments are indicated by same reference numerals, and their explanations are omitted from this specification.

In the step S14, operation mode is selected according to the target outlet air temperature To f, as is similar to that in the second embodiment. When the cooling mode is selected, the program proceeds to a step S15 and a step S101 wherein the opening degree $X_{dsc}$ of the air mixing door 46 is controlled according to the temperature of the heat-absorbing inner heat exchanger 35. When the ventilation mode is selected, the program proceeds to the step S16 and a step S19 wherein the compressor 31 is controlled without the control of the opening degree $X_{dsc}$ of the air mixing door 46. When the heating mode is selected, the program proceeds to the step S18 wherein it is judged whether the warm-up control should be implemented or not. When the judgment in the step S18 is "YES", the program proceeds to a step S125. When the judgment in the step S18 is "NO", the program proceeds to a step S124.

In the step S124, a minimum total air flow rate to the passenger compartment is determined. More specifically, the minimum voltage $V_{fan,min1}$ of the blower fan motor 44 is determined, and the applied voltage $V_{fan}$ is maintained to be larger than the minimum voltage $V_{fan,min1}$.

This setting of the minimum total flow rate is implemented due to the following reason:

In order to control the air flow rate passing through the heat-radiating inner heat exchanger 33, the control of the air flow rate generated by the blower fan 44 and the control of the opening degree $X_{dsc}$ of the air mixing door 46 are implemented. However, busy change of the air flow rate is apt to apply discomfort to vehicle passengers. In particular, during heating operation, the vehicle passengers sensitively feel the flow of air, and have a feeling of physical disorder relative to the change of the air flow rate. Therefore, the busy change of the air flow rate is canceled in order to apply conformable conditioned air to the vehicle passengers. Accordingly, when the flow rate of the conditioned air by the blower fan 37 is minimum, the air flow rate passing through the heat-radiating inner heat exchanger 33 is controlled by only changing the opening degree $X_{dsc}$ of the air mixing door 46.

After the setting of the minimum total air flow rate, the program proceeds to a step S121.

In the step S121, the minimum opening degree $X_{min1}$ is determined, and the opening degree $X_{dsc}$ is kept to be larger than the minimum opening degree $X_{min1}$. With this setting, the minimum air flow rate to the heat-radiating inner heat exchanger during the stable heating condition is ensured, and therefore the refrigeration cycle is stably operated. After the determination of the minimum opening degree $X_{min1}$, the program proceeds the step S102 wherein the opening degree $X_{dsc}$ is controlled according to the temperature of the heat-absorbing inner heat exchanger 35 as is similar to that in the second embodiment. Then, the program proceeds to the step S19.

On the other hand, in the step S125, the minimum amount of the total air flow rate fed to the passenger compartment is determined. More specifically, a minimum voltage $V_{fan,min2}$ of the blower fan motor 44 is determined, and the applied voltage $V_{fan}$ is maintained to be larger than the minimum voltage $V_{fan,rain2}$. With this operation, the busy change of the total air flow rate is avoided, and comfortable conditioned air is supplied to the passenger compartment. After the determination of the minimum total air flow rate, the program proceed to the step S122.

In the step S122, the initial opening degree $X_f$ of the air mixing door 46 is determined, and the opening degree $X_{dsc}$ of the air mixing door 46 is kept at the initial opening degree $X_f$ for a predetermined period. After the lapse of the predetermined period, the program proceeds to the step S123 wherein the minimum opening degree $X_{min2}$ is set. Accordingly, the operating condition in the refrigeration cycle is prevented from the degradation which is caused by the over-decrease of the air flow rate to the heat-radiating inner heat exchanger 33. After the setting of the minimum opening degree $X_{min2}$, the program proceeds to the step S103 wherein the opening degree $X_{dsc}$ is controlled according to the temperature of the heat-absorbing inner heat exchanger 35 as is similar to that in the second embodiment. Then, the program proceeds to the step S19.

In the step S19, the control of the compressor 31 and the compressor motor is implemented according to the compressor control during temperature control heating operation which is shown in the steps S331 to S343 of FIG. 6.

After the routine from the step S14 to the step S19 in FIG. 23 is once implemented, the program returns to the step S2 and is repeated.

That is, with the fourth embodiment of the heat pump type air conditioner according to the present invention, since the total air flow rate during heating operation is maintained to be higher than a predetermined amount, the change of the total flow rate of the conditioned air becomes small, and therefore, comfortable conditioned air is supplied to the vehicle passengers. Further, since the opening degree $X_{dsc}$ of the air mixing door 46 during heating operation is set to be larger than the minimum opening degrees $X_{min1}$ and $X_{min2}$, the refrigeration cycle during the stable heating operation is maintained at a stable condition, and the refrigeration cycle during warm-up operation is prevented from being degraded in condition. Additionally, since the opening degree $X_{dsc}$ of the air mixing door is kept at the initial opening degree $X_f$ just after the starting of warm-up operation, the change of the opening degree is small. This improves the rapid heating property. Accordingly, it becomes possible to realize both the rapid heating and the protection of the window-clouding while maintaining the refrigeration cycle in good condition.

Figure 24:
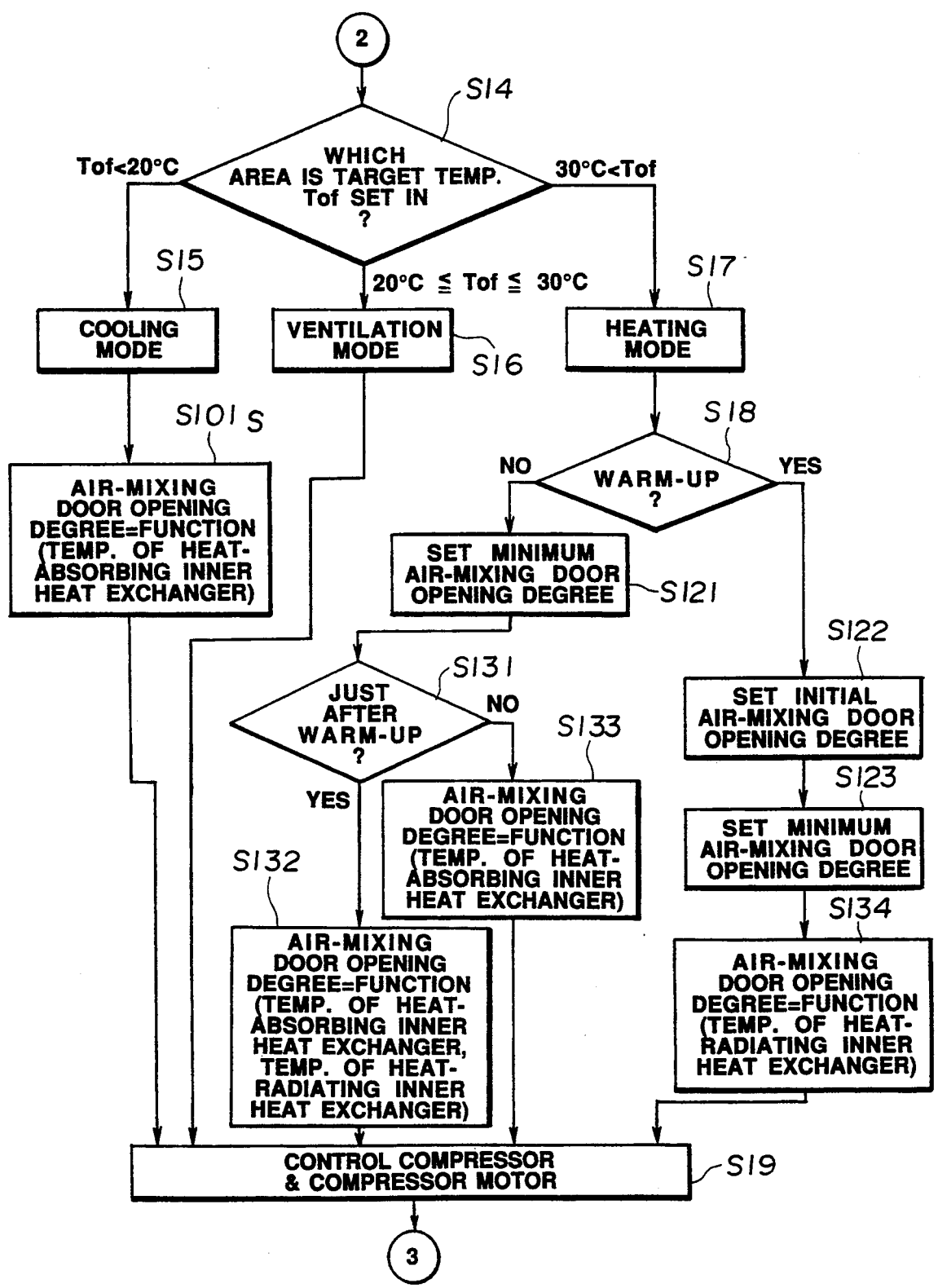
FIG. 24 is a flow chart which shows a control in a fifth embodiment of the heat pump type air conditioner according to the present invention.

Referring to FIGS. 1 and 24, there is shown a fifth embodiment of the heat pump type air conditioner according to the present invention.

The construction of the fifth embodiment is generally similar to the third embodiment except that, during the stable heating operation just after the warm-up operation, the opening degree $X_{dsc}$ of the air mixing door 46 is determined on the basis of both of the temperatures of the heat-radiating inner heat exchanger 33 and the heat-absorbing inner heat exchanger 35.

FIG. 24 shows a flow chart for the control of the fifth embodiment. In this embodiment, same steps as those of the second and third embodiments are indicated by same numeral, and their explanations are omitted from this specification.

In the step S14, operation mode is selected according to the target outlet air temperature $T_{of}$, as is similar to that in the second embodiment. When the cooling mode is selected, the program proceeds through a step S15 to a step S101 wherein the opening degree $X_{dsc}$ of the air mixing door 46 is controlled according to the temperature of the heat-absorbing inner heat exchanger 35. When the ventilation mode is selected, the program proceeds through the step S16 to a step S19 wherein the compressor 31 is controlled without the control of the opening degree $X_{dsc}$ of the air mixing door 46. When heating mode is selected, the program proceeds to the S18 wherein it is judged whether the warm-up control should be implemented or not. When the judgment in the step S18 is "YES", the program proceeds to a step S122. When the judgment in the step S18 is "NO", the program proceeds to the step S121.

After the setting of the minimum total air flow rate, the program proceeds to a step S121.

In the step S121, the minimum opening degree $X_{min1}$ is determined, and the opening degree $X_{dsc}$ is kept to be larger than the minimum opening degree $X_{min1}$. With this setting, the minimum air flow rate to the heat-radiating inner heat exchanger 33 during the stable heating operation is ensured, and therefore the refrigeration cycle is stably operated. After the determination of the minimum opening degree $X_{min1}$, the program proceeds the step S131 wherein it is judged whether it is just after the warm-up operation or not. When the judgment in the step S131 is "YES", the program proceeds to a step S132. When the judgment in the step S131 is "NO", the program proceeds to a step S132.

In the step S132, the opening degree $X_{dsc}$ is determined from the temperatures of the heat-radiating inner heat exchanger 33 and the heat-absorbing inner heat exchanger 35 by applying the following equation:

$$X_{dsc} = \{X_1 \times t + X_2 \times (t_{set} - t)\}/t_{set}$$

wherein $X_{dsc}$ is the opening degree of the air mixing door, $X_1$ is an opening degree which is determined from the temperature of the heat-radiating inner heat exchanger, $X_2$ is an opening degree which is determined from the temperature of the heat-absorbing inner heat exchanger, t is an elapsed time after the start of the stable heating operation, and $t_{set}$ is a predetermined softening time (such as 30–60 seconds).

Since the opening degree $X_{dsc}$ is determined from the opening degrees $X_1$ and $X_2$ which are determined from the temperatures of the heat-radiating and heat-absorbing inner heat exchangers 33 and 35, the lapsed time t from the start of the stable heating condition, and the predetermined softening time $t_{set}$; it becomes possible to gradually change the conditioned air temperature for the predetermined softening time. That is, if the opening degree $X_{dsc}$ is radically changed from the opening degree $X_1$ to the opening degree $X_2$ during the transition process from the warm-up operation to the stable heating operation, the change of the opening degree $X_{dsc}$ becomes large, and therefore the air flow rate of the conditioned air fed to the passenger compartment is largely changed. This may invite the discomfort of the vehicle passengers. Therefore, in order to avoid such a discomfort, the temperature of the conditioned air is gradually changed.

In a step S133, the air mixing door 46 is controlled according to the temperature of the heat-absorbing inner heat exchanger 35, as is similar to the step S102 in the second embodiment.

In the step S122, the initial opening degree $X_f$ is determined, and the opening degree $X_{dsc}$ is kept at the initial opening degree $X_f$ for a predetermined time, as is similar to that in the second embodiment. Further, after the lapse of the predetermined time, the minimum opening degree $X_{min2}$ is set and the program proceeds to a step S134. With this operation, the operating condition of the refrigeration cycle is prevented from the degradation which is caused by the over-decrease of the air flow rate to the heat-radiating inner heat exchanger 33.

In a step S134, the air mixing door 46 is controlled according to the temperature of the heat-absorbing inner heat exchanger 35 as is similar to the step S103 in the second embodiment.

After the control of the air mixing door 46 during the stable heating operation and the warm-up operation, the program proceeds to the step S19 wherein the control of the compressor 31 and the compressor motor 44 is implemented according to the compressor control during the temperature control heating operation which is shown in the steps S331 to S343 of FIG. 6.

After the routine from the step S14 to the step S19 in FIG. 24 is once implemented, the program returns to the step S2 and is again repeated.

With the fifth embodiment, since the opening degree $X_{dsc}$ is determined from the opening degrees $X_1$ and $X_2$ which are determined from the temperatures of the heat-radiating and heat-absorbing inner heat exchangers, the lapsed time t from the start of the stable heating operation, and the predetermined softening time $t_{set}$; it becomes possible to gradually change the conditioned air temperature for the predetermined softening time. Therefore, the temperature of the conditioned air is gradually changed without causing the large change of the air flow rate fed to the passenger compartment.

Although the fifth embodiment has been shown and described on both of the conditions of the stable heating operation and the warm-up operation, by gradually switching the evaluation of the factor regarding plural thermal information which is used in the plural modes, it becomes possible that the temperature of the conditioned air is smoothly changed as the same as that in the plural mode even if it is applied to a single mode.

That is, by transforming the opening degrees $X_1$ and $X_2$ into weighted-average according to the thermal information of the vehicle and the refrigeration cycle, even if a single mode is applied, it becomes possible to obtain a function which is similar to the function obtained in the plural mode.

Figure 25:
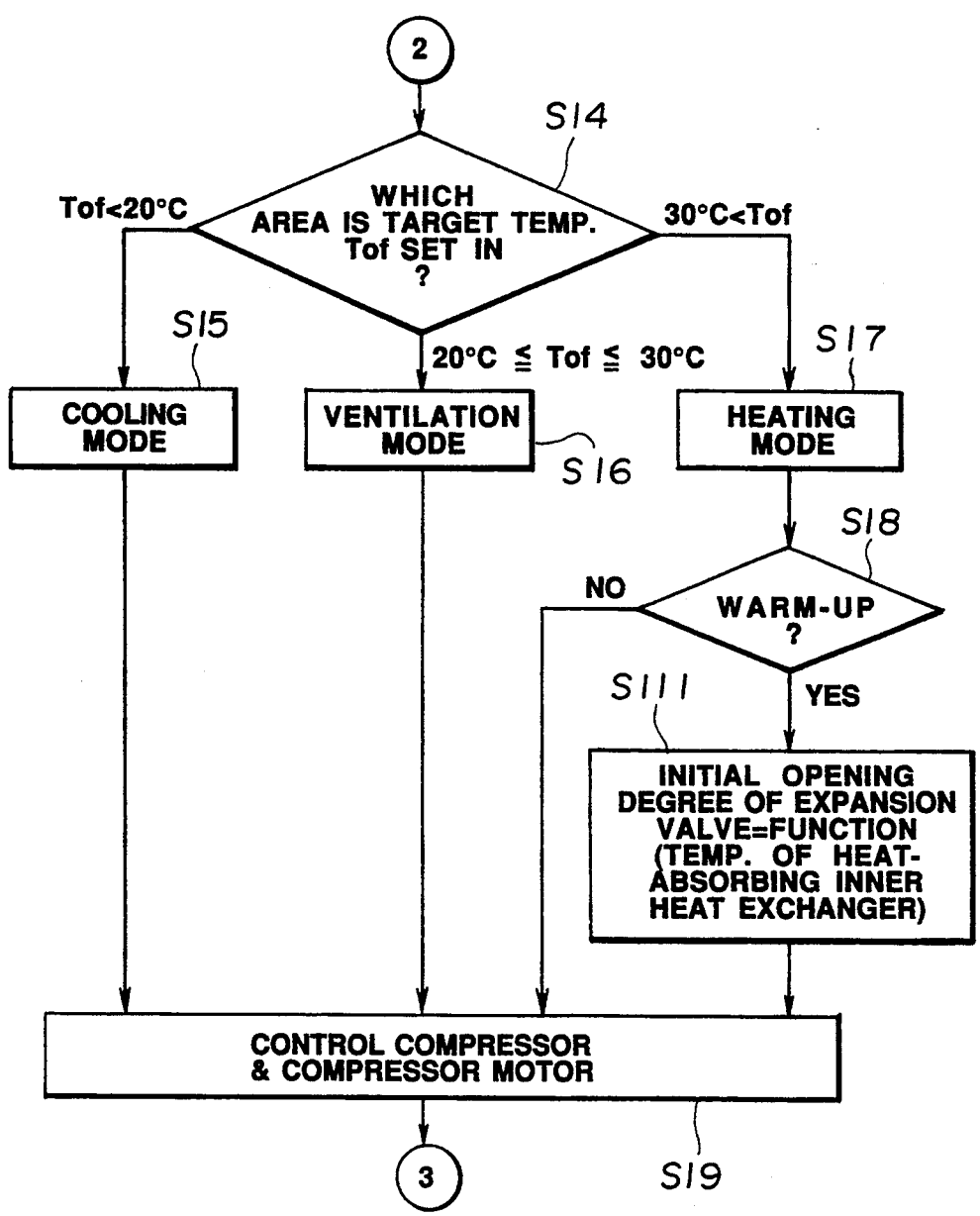
FIG. 25 is a flow chart which shows a control in a sixth embodiment of the heat pump type air conditioner according to the present invention.

Referring to FIGS. 1 and 25, there is shown a sixth embodiment of the heat pump type air conditioner according to the present invention.

The construction of the sixth embodiment is generally similar to that of the third embodiment except that an initial opening degree is $Y_f$ of the expansion valve is determined.

The opening degree of the expansion valve 43 is variably changeable, and the expansion valve 43 in the sixth embodiment constitutes an expansion means. The control unit 43 constitutes a opening degree controlling means.

FIG. 25 shows a flow chart of the control of the sixth embodiment of the heat pump type air conditioner according to the present invention. In this embodiment, same steps as that in the second embodiment are indicated by same reference numerals, and their explanations are omitted from the specification.

In the step S14, operation mode is selected according to the target outlet air temperature $T_{of}$, as is similar to that in the second embodiment. When the cooling mode is selected, the program proceeds to a step S15 wherein the opening degree $X_{dsc}$ of the air mixing door 46 is controlled according to the temperature of the heat-absorbing inner heat exchanger 35. When the ventilation mode is selected, the program proceeds to the step S16 wherein the control of the opening degree $X_{dsc}$ of the air mixing door 46 is not implemented. Following this, the program proceeds to a step S19 wherein the compressor control is implemented. When the heating mode is selected, the program proceeds through a step S17 to the step S18 wherein it is judged whether the warm-up control should be implemented or not. When the judgment in the step S18 is "YES", the program proceeds to a step S111. When the judgment in the step S18 is "NO", the program proceeds to the step S19.

The setting of the initial opening degree $Y_f$ of the expansion valve 34 is implemented due to the following reasons:

In general, in case that an expansion valve of an automatic temperature reacting type is used during cooling operation of the refrigeration cycle, it is judged that the passenger compartment is sufficiently cooled when the detected temperature is low. Accordingly, the expansion valve 34 is controlled so as to decrease the refrigerant circulating amount in the refrigeration cycle, that is, to decrease the opening degree of the expansion valve 34. However, since a temperature detecting cylinder (detector) detects the temperature of the refrigerant which flows into the heat-absorbing inner heat exchanger 35, it is apprehended that the refrigerant does not flow due to the closing of the expansion valve 34 if the refrigeration cycle is started under a low ambient air temperature. Accordingly, if such an expansion valve is applied to the embodiments according to the present invention, it is apprehended that the rapid heating cannot be kept on. That is, since the air conditioner according to the present invention is arranged to operate the heat-absorbing inner heat exchanger 35 for the dehumidification even during heating operation, it is apprehended that none of the refrigerant is circulated in the refrigeration cycle at the start of the heating operation due to the above-mentioned reason. Therefore, in order to ensure the minimum circulation amount of the refrigerant, the initial opening degree $Y_f$ is set, and the opening degree Y of the expansion valve 34 is maintained so as not to become zero.

If an electromagnetic type expansion valve is used as the expansion valve 34, it becomes possible to inevitably control the expansion valve 34 at a predetermined opening degree. If an expansion valve of an automatic temperature reacting type is used, by providing a heating means such as an electric heater for the temperature detecting cylinder and by heating the temperature detecting cylinder at a predetermined temperature, it becomes possible to control the expansion valve at a predetermined opening degree without implementing a fine temperature control. Accordingly, it becomes possible to ensure a sufficient flow rate of the refrigerant at an initial period of the warm-up operation.

After the determination of the initial opening degree $Y_f$ of the expansion valve 34 in a step S111, the program proceeds to the step S19 wherein the control of the compressor 31 and the compressor motor is implemented according to the compressor control during the temperature control heating operation which is shown in the steps S331 to S343 of FIG. 6.

After the routine from the step S14 to the step S19 in FIG. is once implemented, the program returns to the step S2 and is again repeated.

With the sixth embodiment, since the initial opening degree $Y_f$ of the expansion valve 34 is determined during the warm-up control, even if the ambient temperature is low, a necessary amount of the refrigerant is circulated without the full closing of the expansion valve 34. Therefore, it becomes possible to implement the smooth start of the refrigeration cycle even if the air conditioner implements the dehumidification heating operation and to ensure the rapid warming property.

Referring to FIG. 1 and 26 to 29, there is shown a seventh embodiment of the heat pump air conditioner according to the present invention.

The construction of the seventh embodiment is generally similar to the sixth embodiment except that an electromagnetic expansion valve, by which the opening degree is freely controlled, is used as the expansion valve 34 in order to control the opening degree Y of the expansion valve 34 according to the refrigerant condition in the refrigeration cycle.

Figure 26:
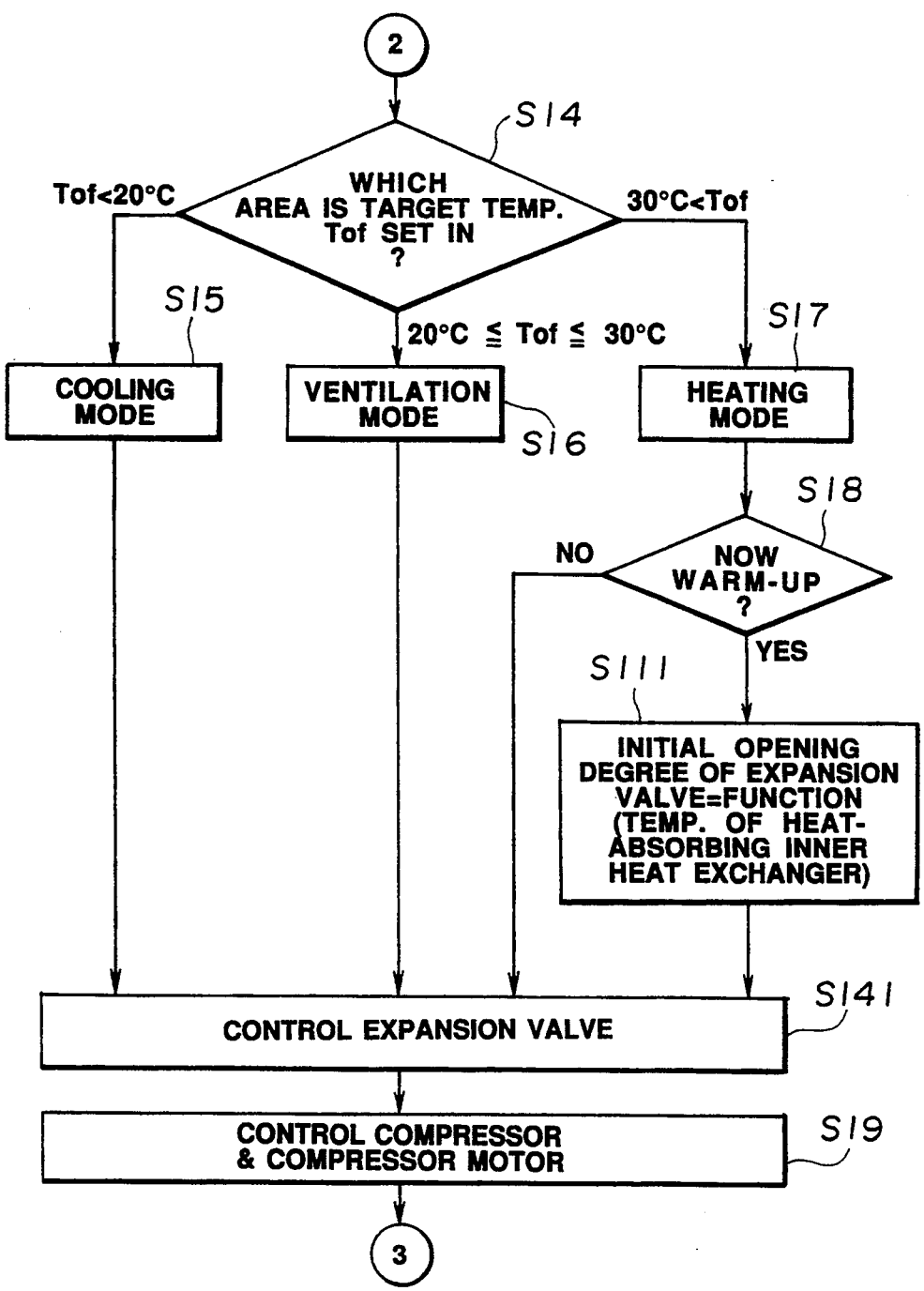
FIGS. 26 to 27 are flow charts which show controls in a seventh embodiment of the heat pump type air conditioner according to the present invention.

FIG. 26 shows a flow chart of the control of the seventh embodiment. In this embodiment, steps as same as that in the second and third embodiments is indicated by same numeral, and their explanation are omitted in the specification.

In the step S14, operation mode is selected according to the target outlet air temperature $T_{of}$, as is similar to that in the second embodiment. When the cooling mode is selected, the program proceeds through a step S15 to a step S141 wherein the opening degree of the expansion valve 34 is controlled. Following this, the program proceeds to the step S19 wherein the compressor is controlled. When the ventilation mode is selected, the program proceeds to the step S16 and the step S 141. When heating mode is selected, the program proceeds to the S18 wherein it is judged whether the warm-up control should be implemented or not. When the judgment in the step S18 is "YES", the program proceeds to a step S111 wherein an initial opening degree $Y_f$ of the expansion valve 34 is determined according to the temperature of the heat-absorbing inner heat exchanger 35. When the judgment in the step S18 is "NO", the program proceeds to the step S141.

In the step S19, the control of the compressor 31 and the compressor motor 44 is implemented according to the compressor control during temperature control heating operation of the steps S331 to S343 shown in FIG. 6.

After the routine from the step S14 to the step S19 in FIG. 23 is once implemented, the program returns to the step S2 and is repeated.

Figure 27:
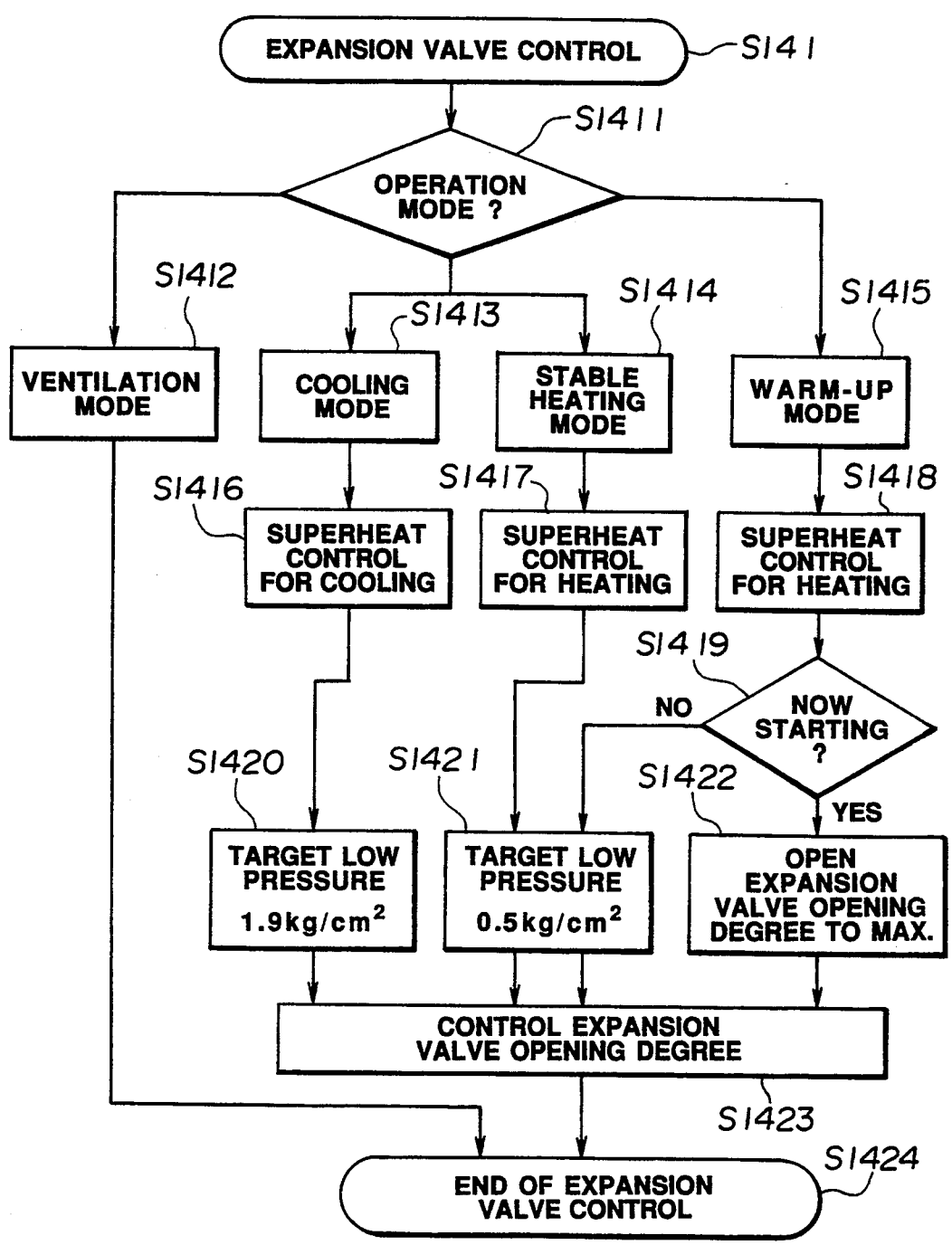

FIG. 27 shows a flow chart of the control of the electromagnetic expansion valve 34 which is applied to the seventh embodiment of the heat pump type air conditioner according to the present invention.

After starting of the control of the electromagnetic expansion valve 34 in the step S141, the program proceeds to a step S1411.

In the step S1411, it is judged on the basis of the target outlet air temperature $T_{of}$ which operation mode of the cooling mode, the ventilation mode, and the heating mode is now implemented. When it is judged that the heating mode is implemented, it is further judged in the step S1411 which the stable heating mode or warm up mode is implemented. When it is judged that the ventilation mode is implemented, the program proceeds to a step S1412. When it is judged that the cooling mode is implemented, the program proceeds to a step S1413. When it is judged that the stable heating mode is implemented, the program proceeds to a step S1414. When it is judged that the warm-up mode is implemented, the program proceeds to a step S1415.

In the step S1412, the refrigeration cycle is stopped, and therefore, the electromagnetic expansion valve 34 is also turned off. Accordingly, the program proceeds to a step S1424 wherein the routine for control of the electromagnetic expansion valve 34 is achieved.

In the step S1413, in reply to the judgment to be the cooling mode, the program proceeds to a step S1416 wherein a superheat control for the cooling, which will be discussed later, is implemented.

In a step S1420, a target low-pressure in the refrigeration cycle is set at 1.9 kg/cm². Following this, the program proceeds to the step S1423.

In the step S1414, since the stable heating mode is implemented, the program proceeds to a step S1417 wherein a superheat control for the stable heating is implemented. Accordingly, the program proceeds to a step S1421 wherein a target low pressure in the refrigeration cycle is set at 0.8 kg/cm². Following this, the program proceeds to the step S1423.

In order to increase the outlet conditioned air temperature during the heating operation, the target low pressure in the heating mode is decreased to be lower than that in the cooling mode. That is, with this decrease of the target low pressure, the opening degree Y of the expansion valve 34 is decreased, and the high pressure is increased. Therefore, the heat absorbing amount in the heat-absorbing inner heat exchanger 35 is decreased due to the increase of the discharge temperature of the refrigerant from the expansion valve. This raises the outlet conditioned air temperature.

In the step S1415, since it is judged that the warm-up mode is implemented, the program proceeds to a step S1419 wherein it is judged whether the air conditioner was now started or not. When the judgment in the step S1419 is "NO", the program proceeds to a step S1421 wherein the target low pressure is set at 0.5 kg/cm². Following this, the program proceeds to the step S1423. In order to avoid the stoppage of the circulation of the refrigerant during low ambient air temperature and to ensure a circulation refrigerant amount which higher than a necessary minimum mount, the opening degree Y of the expansion valve 34 is set at a maximum at a starting time.

In the step S1423, the control of the opening degree Y of the expansion valve 34 is implemented. Then, the program proceeds to the step S1424.

Figure 28:
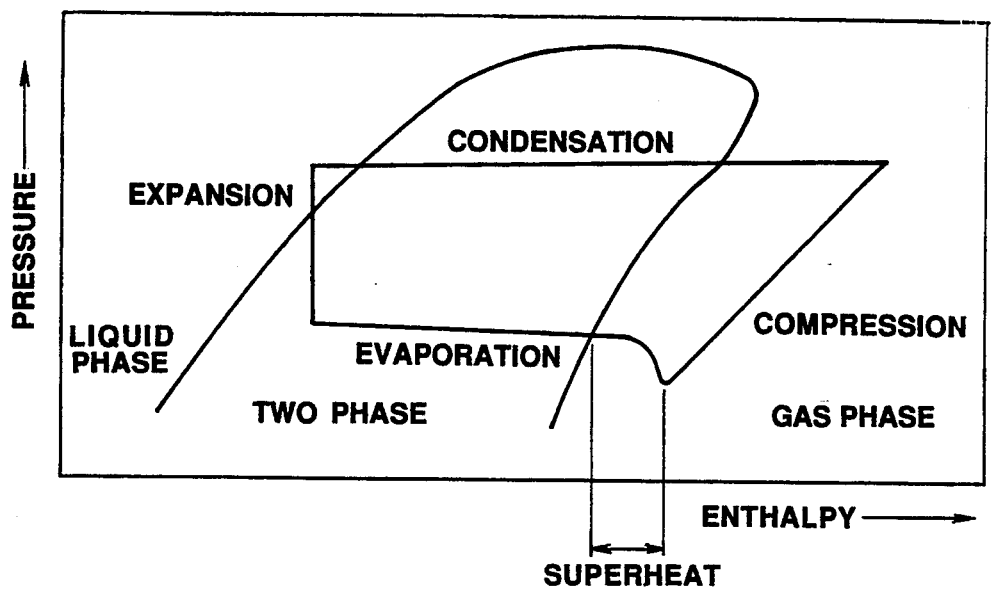
FIG. 28 is a Mollier diagram which shows a refrigeration cycle of the seventh embodiment.
Figure 29:
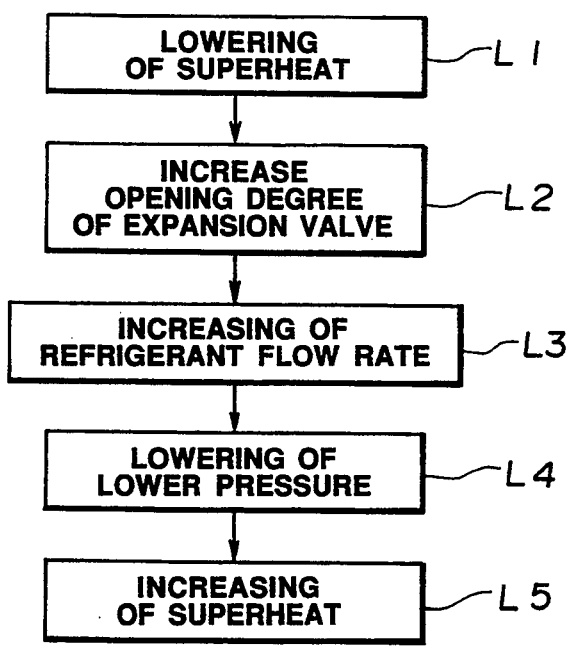
FIG. 29 is a logic chart for a superheat control applied to the seventh embodiment.
Figure 30:
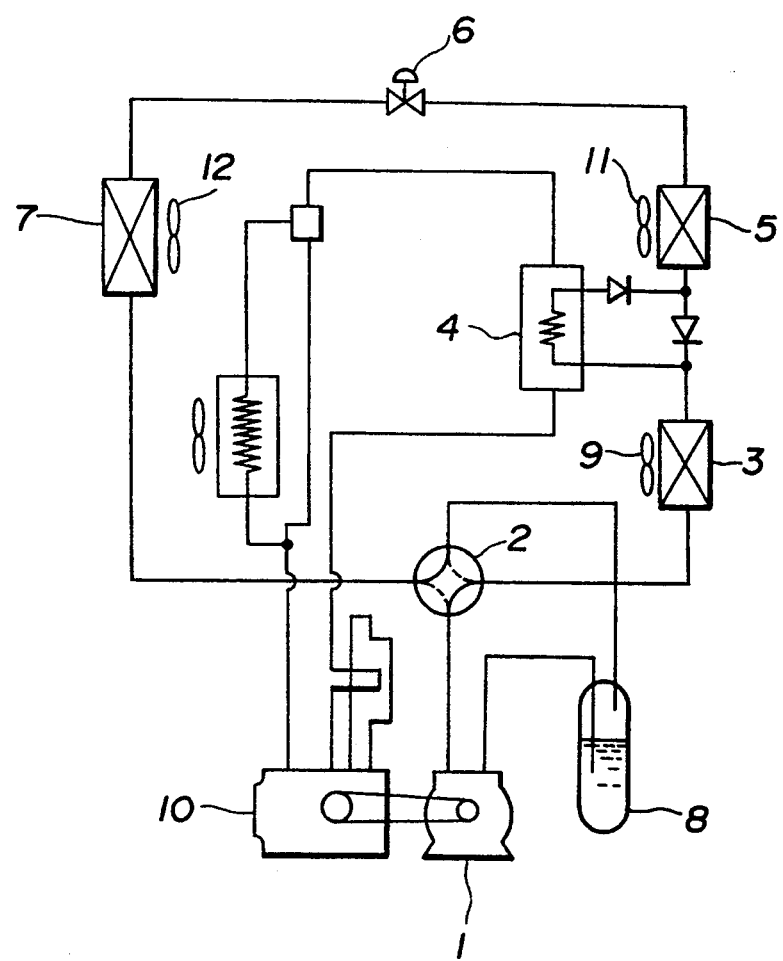
FIG. 30 is a schematic view of a conventional heat pump type air conditioner for an automotive vehicle.

Referring to FIGS. 28 and 29, the superheat control will be discussed hereinafter.

FIG. 28 shows Mollier diagram (Pressure-Enthalpy diagram) wherein a vertical axis represents pressure, a vertical axis represents enthalpy (heating value), and the refrigeration cycle which includes a compression process, condensation (heat radiation), expansion, and evaporation (heat absorption) is represented. In the Mollier diagram, a process a-b in a gas phase represents a superheat. That is, the superheat indicates a difference between the inlet refrigerant temperature fed into the heat-absorbing inner heat exchanger 35 and the refrigerant evaporation temperature. Therefore, the superheat control is a control for controlling the difference at superheat with a predetermined range.

FIG. 29 shows a logic for implementing the superheat control. In a step L1, it is acknowledged that the superheat is lower than a target superheat. In a step L2, the opening degree Y of the expansion valve is increased. In a step L3, the flow rate of the refrigerant in the refrigeration cycle is increased. In a step L4, the low pressure in the refrigeration cycle is decreased in response to the operation in the step L3. In a step L5, the superheat is increased.

With the seventh embodiment of the heat pump type air conditioner according to the present invention, since an electromagnetic expansion valve is applied and the opening degree Y of the expansion valve 34 is controlled according to the refrigerant condition in the refrigeration cycle, it becomes possible to directly control the circulation amount of the refrigerant and to further exactly stabilize the refrigeration cycle.

What is claimed is:

1. A heat pump type air conditioner for an automotive vehicle, comprising:

refrigerant;

a compressor applying a workload to said refrigerant;

a condenser connected to a refrigerant discharge side of said compressor and radiating heat of said refrigerant into ambient air;

a blower leading air for air-conditioning the passenger compartment of the automotive vehicle;

a heat-radiating inner heat exchanger connected to the refrigerant discharge side of said compressor and transmitting the heat of said refrigerant to the air led by said blower;

an expansion valve connected to a refrigerant outlet side of said heat-radiating inner heat exchanger;

an evaporator connected to a refrigerant outlet side of said expansion valve, said evaporator transmitting the heat of the air led by said blower to said refrigerant which is supplied through said expansion valve from at least one of said condenser and said heat-radiating inner heat exchanger;

a switching device disposed among the refrigerant discharge side of said compressor, said switching device being set at one of a first state in that said compressor is fluidly communicated with said condenser and a second state in that said compressor is fluidly communicated with said heat-radiating inner heat exchanger; and means for lowering a cooling efficiency of said evaporator for a predetermined time when said compressor is started.

2. A heat pump type air conditioner as claimed in claim 1, wherein said means for lowering a cooling efficiency for a predetermined time includes means for lowering an inlet air flow rate to said heat-radiating inner heat exchanger for a predetermined time.

3. A heat pump type air conditioner as claimed in claim 1, wherein said means for lowering a cooling efficiency for a predetermined time includes a means for raising the inlet air temperature of said heat-radiating inner heat exchanger for a predetermined time so as to be higher than the outlet air temperature of said evaporator.

4. A heat pump type air conditioner as claimed in claim 1, wherein said means for lowering a cooling efficiency for a predetermined time includes means for raising the inlet air temperature of said evaporator for a predetermined time.

5. A heat pump type air conditioner as claimed in claim 1, wherein said means for lowering cooling efficiency for a predetermined time includes means for decreasing the opening degree of said expansion valve for a predetermined time.

6. A heat pump type air conditioner for an automotive vehicle, comprising:

refrigerant;

a compressor applying a workload to said refrigerant;

a condenser connected to a refrigerant discharge side of said compressor and radiating heat of said refrigerant into ambient air;

a blower leading air for air-conditioning the passenger compartment of the automotive vehicle;

a heat-radiating inner heat exchanger connected to the refrigerant discharge side of said compressor and transmitting the heat of said refrigerant to the air led by said blower;

an expansion valve connected to a refrigerant outlet side of said heat-radiating inner heat exchanger;

an evaporator connected to a refrigerant outlet side of said expansion valve, said evaporator transmitting the heat of the air led by said blower to said refrigerant which is supplied through said expansion valve from at least one of said condenser and said heat-radiating inner heat exchanger;

a switching device disposed among the refrigerant discharge side of said compressor, said switching device being set at one of a first state in that said compressor is fluidly communicated with said condenser and a second state in that said compressor is fluidly communicated with said heat-radiating inner heat exchanger;

air flow rate changing means changing flow rate of the air fed into said heat-radiating inner heat exchanger;

thermal information detecting means detecting at least one of thermal information of said refrigerant and thermal information of the automotive vehicle inside and outside;

process selecting means dividing the heating operation into plural processes which have different heating properties, respectively, said process selecting means selecting one of the process on the basis of the thermal information detected by said thermal information detecting means; and air flow rate controlling means variably controlling said air flow rate changing means on the basis of said selected process and the detected thermal information.

7. A heat pump type air conditioner as claimed in claim 6, wherein said thermal information detecting means detects a correlation amount to high-pressure side of refrigeration cycle and a correlation amount to low-pressure side of the refrigeration cycle, said air flow rate controlling means variably controlling said air flow rate changing means on the basis of the low-pressure side correlation amount during a process selected by said process selecting means, and said air flow rate control means controlling said air flow rate changing means on the basis of the high-pressure side correlation amount during a process except of the process selected by said process selecting means.

8. A heat pump type air conditioner as claimed in claim 7, wherein said air flow rate controlling means uses a temperature of the air passing through said heat-radiating inner heat exchanger as the high-pressure side correlation amount and uses a temperature of the air passing through said evaporator as the low-pressure side correlation amount.

9. A heat pump type air conditioner as claimed in claim 8, wherein said air flow rate controlling means defines a minimum value of the air flow rate to said heat-radiating inner heat exchanger.

10. A heat pump type air conditioner as claimed in claim 9, wherein said air flow rate changing means includes inlet air flow rate changing means which changes flow rate of the air fed by said blower and ratio changing means which changes a ratio of air fed to said heat-radiating inner heat exchanger relative to the air fed by said blower, and said air flow rate control means defining a minimum value of the air flow rate changed by the inlet air flow rate changing means and a minimum value of the ratio changed by the ratio changing means.

11. A heat pump type air conditioner as claimed in claim 6, wherein said thermal information detecting means detects thermal information applied to a first process and thermal information applied to a second process when the operation moves from the first process to the second process wherein the first and second processes continuously operated, and said air flow rate controlling means gradually changing a controlled state of said air flow rate changing means on the basis of the thermal information applied to the first and second processes.

12. A heat pump type air conditioner as claimed in claim 6, wherein said air flow rate controlling means defines an initial air flow rate of the air flowing into said heat-radiating inner heat exchanger on the basis of the thermal information detected at the start of said compressor.

13. A heat pump type air conditioner for an automotive vehicle, comprising:
refrigerant;
a compressor applying a workload to said refrigerant;
a condenser connected to a refrigerant discharge side of said compressor and radiating heat of said refrigerant into ambient air;
a blower leading air for air-conditioning the passenger compartment of the automotive vehicle;
a heat-radiating inner heat exchanger connected to the refrigerant discharge side of said compressor and transmitting the heat of said refrigerant to the air led by said blower;
an expansion valve of a variable opening degree type connected to a refrigerant outlet side of said heat-radiating inner heat exchanger;
an evaporator connected to a refrigerant outlet side of said expansion valve, said evaporator transmitting the heat of the air led by said blower to said refrigerant which is supplied through said expansion valve from at least one of said condenser and said heat-radiating inner heat exchanger;
a switching device disposed among the refrigerant discharge side of said compressor, a refrigerant inlet side at said condenser and a refrigerant inlet side of said heat-radiating inner heat exchanger, said switching device being set at one of a first state in that said compressor in fluidly communicated with said condenser and a second state in that said compressor is fluidly communicated with said heat-radiating inner heat exchanger;
thermal information detecting means detecting at least one of thermal information of said refrigerant and thermal information of the automotive vehicle inside and outside; and
expansion valve controlling means controlling an opening degree of said expansion valve on the basis of the detected thermal information such that the flow rate of said refrigerant is maintained to be larger than a predetermined value and such that the opening degree of said expansion valve is greater than zero at warm-up or start-up of a heating operation.

14. A heat pump type air conditioner as claimed in claim 13, wherein said thermal information detecting means includes a detector which detects a correlation amount of a low-pressure side in refrigeration cycle.

15. A heat pump type air conditioner as claimed in claim 14, further comprising means for heating the detector according to the amount relation with the low pressure side in the refrigeration cycle.

16. A heat pump type air conditioner as claimed in claim 13, wherein said expansion valve includes an electromagentic expansion valve which is able to vary its opening degree according to the thermal information detected by said thermal information detecting means.

17. A heat pump type air conditioner as claimed in claim 16 wherein said expansion valve controlling means uses at least one of the air temperature of air passing through said heat-radiating inner heat exchanger and the air temperature of air passing through said evaporator as the basis for controlling the opening degree of said expansion valve.

* * * * *